(12) United States Patent
Schrage et al.

(10) Patent No.: US 9,114,346 B2
(45) Date of Patent: Aug. 25, 2015

(54) Z-FILTER MEDIA PACK ARRANGEMENT; AND, METHODS

(71) Applicant: DONALDSON COMPANY, INC., Bloomington, MN (US)

(72) Inventors: Kevin Schrage, Spring Valley, MN (US); Eugene Lensing, Spillville, IA (US); Jeff Rahlf, Elma, IA (US); Wayne Bishop, St. Louis Park, MN (US); Gregory Reichter, Bloomington, MN (US); Benny Nelson, Bloomington, MN (US); Rodger Spears, Bloomington, MN (US); Bruce Crenshaw, Frankfort, IN (US); Vladimir Kladnitsky, Eagan, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 13/975,880

(22) Filed: Aug. 26, 2013

(65) Prior Publication Data
US 2014/0123610 A1 May 8, 2014

Related U.S. Application Data

(63) Continuation of application No. 13/572,796, filed on Aug. 13, 2012, now Pat. No. 8,518,141, which is a continuation of application No. 13/079,118, filed on Apr. 4, 2011, now Pat. No. 8,241,383, which is a (Continued)

(51) Int. Cl.
*B01D 46/00* (2006.01)
*B01D 46/52* (2006.01)
(Continued)

(52) U.S. Cl.
CPC ............ *B01D 46/527* (2013.01); *B01D 25/001* (2013.01); *B01D 46/0001* (2013.01);
(Continued)

(58) Field of Classification Search
CPC .. B01D 45/16; B01D 47/06; B01D 2271/027; B01D 2275/10; B65G 53/60
USPC ............... 55/385.5, 432, 486, 497–498, 502, 55/520–521, 524, 528, 300, 303; 95/280, 95/285, 287
See application file for complete search history.

(56) References Cited

U.S. PATENT DOCUMENTS

| 3,025,963 A | 3/1962 | Bauer |
| 4,410,427 A | 10/1983 | Wydeven |

(Continued)

FOREIGN PATENT DOCUMENTS

| CN | 2362582 | 2/2000 |
| DE | 88 08 632 | 9/1988 |

(Continued)

OTHER PUBLICATIONS

PCT Search Report and Written Opinion for PCT/US2005/019777 dated Sep. 28, 2005.

(Continued)

*Primary Examiner* — Jason M Greene
*Assistant Examiner* — Karla Hawkins
(74) *Attorney, Agent, or Firm* — Merchant & Gould P.C.

(57) ABSTRACT

Z-filter media pack arrangements and methods for providing them are described. The preferred arrangements have a cured-in-place jacket around an outside of a coiled z-filter media combination. The preferred cured-in-place jacket is a mold-in-place overmold which includes, integral therein, a housing seal arrangement. Preferably a cured-in-place center core is used, most preferably one that has opposite concave ends with seal arrangements configured to seal a lead end portion of the coiled z-filter media combination.

33 Claims, 17 Drawing Sheets

Related U.S. Application Data continuation of application No. 11/629,033, filed as application No. PCT/US2005/019777 on Jun. 6, 2005, now Pat. No. 7,967,886.

(60) Provisional application No. 60/578,482, filed on Jun. 8, 2004.

(51) Int. Cl.
 B01D 25/00 (2006.01)
 B29D 99/00 (2010.01)

(52) U.S. Cl.
 CPC .............. *B01D46/525* (2013.01); *B29D 99/00* (2013.01); *B01D 2201/34* (2013.01); *B01D 2265/04* (2013.01); *B01D 2271/02* (2013.01); *Y02E 50/10* (2013.01); *Y02E 50/30* (2013.01)

(56) References Cited

U.S. PATENT DOCUMENTS

| | | | |
|---|---|---|---|
| 4,589,983 A | 5/1986 | Wydevan | |
| 4,925,561 A | 5/1990 | Ishii et al. | |
| 5,222,488 A | 6/1993 | Forsgren et al. | |
| 5,391,212 A | 2/1995 | Ernst et al. | |
| 5,435,870 A | 7/1995 | Takagaki et al. | |
| 5,472,463 A | 12/1995 | Herman et al. | |
| 5,543,007 A | 8/1996 | Takagaki et al. | |
| 5,562,825 A | 10/1996 | Yamada et al. | |
| 5,759,217 A | 6/1998 | Joy | |
| 5,772,883 A | 6/1998 | Rothman et al. | |
| D396,098 S | 7/1998 | Gillingham et al. | |
| 5,792,247 A | 8/1998 | Gillingham et al. | |
| 5,795,361 A | 8/1998 | Lanier, Jr. et al. | |
| D398,046 S | 9/1998 | Gillingham et al. | |
| D399,944 S | 10/1998 | Gillingham et al. | |
| 5,820,646 A | 10/1998 | Gillingham et al. | |
| 5,891,402 A | 4/1999 | Sassa et al. | |
| 5,895,574 A | 4/1999 | Gillingham et al. | |
| 5,902,364 A | 5/1999 | Tokar et al. | |
| D417,268 S | 11/1999 | Gillingham et al. | |
| 6,048,386 A | 4/2000 | Gillingham et al. | |
| D425,189 S | 5/2000 | Gillingham et al. | |
| D428,128 S | 7/2000 | Gillingham et al. | |
| 6,179,890 B1 | 1/2001 | Ramos | |
| D437,402 S | 2/2001 | Gieseke et al. | |
| 6,190,432 B1 | 2/2001 | Gieseke et al. | |
| 6,210,469 B1 | 4/2001 | Tokar | |
| 6,235,195 B1 | 5/2001 | Tokar | |
| D450,827 S | 11/2001 | Gieseke et al. | |
| D450,828 S | 11/2001 | Tokar | |
| 6,348,084 B1 | 2/2002 | Gieseke et al. | |
| 6,348,085 B1 | 2/2002 | Tokar et al. | |
| 6,350,291 B1 | 2/2002 | Gieseke et al. | |
| 6,368,374 B1 | 4/2002 | Tokar | |
| 6,375,700 B1 | 4/2002 | Jaroszczyk et al. | |
| D460,169 S | 7/2002 | Anderson et al. | |
| D461,003 S | 7/2002 | Gieseke et al. | |
| 6,416,605 B1 | 7/2002 | Golden | |
| D461,884 S | 8/2002 | Gieseke et al. | |
| D464,129 S | 10/2002 | Xu et al. | |
| D466,602 S | 12/2002 | Gieseke et al. | |
| 6,517,598 B2 | 2/2003 | Anderson et al. | |
| D473,637 S | 4/2003 | Golden | |
| 6,610,126 B2 | 8/2003 | Xu et al. | |
| D483,459 S | 12/2003 | Dewit | |
| D484,584 S | 12/2003 | Anderson et al. | |
| 6,673,136 B2 | 1/2004 | Gillingham et al. | |
| 6,783,565 B2 | 8/2004 | Gieseke et al. | |
| D497,202 S | 10/2004 | Stavos et al. | |
| 6,852,141 B2 | 2/2005 | Bishop et al. | |
| 6,953,124 B2 | 10/2005 | Winter et al. | |
| 6,966,940 B2 * | 11/2005 | Krisko et al. | 55/497 |
| 7,090,712 B2 | 8/2006 | Gillingham et al. | |
| 7,258,719 B2 | 8/2007 | Miller et al. | |
| 7,282,075 B2 | 10/2007 | Sporre et al. | |
| 7,303,604 B2 | 12/2007 | Gieseke et al. | |
| 7,323,029 B2 | 1/2008 | Olson et al. | |
| 7,329,326 B2 | 2/2008 | Wagner et al. | |
| 7,364,601 B2 | 4/2008 | Xu et al. | |
| 7,396,376 B2 | 7/2008 | Schrage et al. | |
| 7,488,365 B2 | 2/2009 | Golden et al. | |
| 7,635,403 B2 | 12/2009 | Nepsund et al. | |
| 7,645,310 B2 | 1/2010 | Krisko et al. | |
| 7,655,074 B2 | 2/2010 | Nepsund et al. | |
| 7,674,308 B2 | 3/2010 | Krisko et al. | |
| 7,682,416 B2 | 3/2010 | Engelland et al. | |
| 7,967,886 B2 | 6/2011 | Schrage et al. | |
| 8,034,145 B2 | 10/2011 | Boehrs et al. | |
| 8,226,786 B2 | 7/2012 | Schrage et al. | |
| 8,241,383 B2 | 8/2012 | Schrage et al. | |
| 8,496,774 B2 | 7/2013 | Schrage et al. | |
| 8,518,141 B2 | 8/2013 | Schrage et al. | |
| 2001/0032545 A1 | 10/2001 | Goto et al. | |
| 2002/0073850 A1 | 6/2002 | Tokar et al. | |
| 2002/0185007 A1 | 12/2002 | Xu et al. | |
| 2003/0037675 A1 * | 2/2003 | Gillingham et al. | 95/280 |
| 2004/0060861 A1 | 4/2004 | Winter et al. | |
| 2004/0221555 A1 | 11/2004 | Engelland et al. | |
| 2005/0166561 A1 | 8/2005 | Schrage et al. | |
| 2006/0163150 A1 | 7/2006 | Golden et al. | |
| 2007/0039296 A1 | 2/2007 | Schrage et al. | |
| 2008/0307759 A1 | 12/2008 | Reichter et al. | |
| 2009/0064646 A1 | 3/2009 | Reichter et al. | |
| 2009/0151311 A1 | 6/2009 | Reichter et al. | |

FOREIGN PATENT DOCUMENTS

| | | |
|---|---|---|
| EP | 1 166 843 | 1/2002 |
| EP | 1410832 | 5/2007 |
| EP | 1795246 | 3/2008 |
| FR | 2 214 505 A | 8/1974 |
| GB | 2 082 932 A | 3/1982 |
| JP | 58-151417 | 9/1983 |
| JP | 60-112320 | 6/1985 |
| JP | 1-171615 | 4/1989 |
| JP | 1-163408 | 11/1989 |
| JP | 2-25009 | 2/1990 |
| JP | 11-226312 | 8/1999 |
| WO | WO 97/40917 | 11/1997 |
| WO | WO 2005/077487 A1 | 8/2005 |

OTHER PUBLICATIONS

PCT Search Report and Witten Opinion for PCT/US2005/028002 dated Nov. 22, 2005.
PCT Search Report and Written Opinion for PCT/US2005/20593 dated Nov. 28, 2005.
PCT Search Report and Written Opinion for PCT/US2006/001021 dated May 29, 2006.
Pending claims in U.S. Appl. No. 13/953,188 dated Jan. 15, 2014.
Pending allowed claims of U.S. Appl. No. 13/953,188.
Declaration of Inventor Kevin J. Schrage under 37 C.F.R. § 1.132.

* cited by examiner

Z-FILTER MEDIA PACK ARRANGEMENT; AND, METHODS

CROSS REFERENCE TO RELATED APPLICATIONS

This application is a continuation application of U.S. Ser. No. 13/572,796, filed Aug. 13, 2012, which has now issued as U.S. Pat. No. 8,518,141; which was itself a continuation of U.S. Ser. No. 13/079,118, filed Apr. 4, 2012, which issued as U.S. Pat. No. 8,241,383. U.S. Ser. No. 13/079,118 is a continuation application of U.S. Ser. No. 11/629,033, which issued as U.S. Pat. No. 7,967,886. U.S. Ser. No. 11/629,033, was filed Dec. 7, 2006, as a National Stage of PCT/US2005/019777, filed Jun. 6, 2005 with a claim of priority to U.S. Ser. No. 60/578,482 (a U.S. provisional application) filed Jun. 8, 2004. A claim of priority to each of U.S. Ser. No. 13/572,796; U.S. Ser. No. 13/079,118; U.S. Ser. No. 11/629,033; PCT/US2005/019777; and, U.S. provisional patent application Ser. No. 60/578,482 is made to the extent appropriate. The complete disclosures of U.S. Ser. No. 13/572,796; U.S. Ser. No. 13/079,118; PCT/US2005/091777; U.S. Ser. No. 11/629,033; and, provisional patent application 60/578,482 are incorporated herein by reference.

FIELD OF THE DISCLOSURE

The present disclosure relates to filter media for use in filtering liquids or gases. The disclosure particularly relates to media packs that use z-filter media which comprises a corrugated media sheet secured to facing sheet, formed into a media pack. Specifically, the disclosure relates to formation of such media packs and their inclusion in serviceable filter cartridge arrangements, typically for use in air cleaners. Methods of assembly and use are also described.

BACKGROUND

Fluid streams, such as air and liquid, can carry contaminant material therein. In many instances, it is desired to filter some or all of the contaminant material from the fluid stream. For example, air flow streams to engines (for example combustion air) for motorized vehicles or for power generation equipment, gas streams to gas turbine systems and air streams to various combustion furnaces, carry particulate contaminant therein that should be filtered. Also, liquid streams and engine lube systems, hydraulic systems, coolant systems and fuel systems, carry contaminant that should be filtered. It is preferred for such systems, that selected contaminant material been removed from (or have its level reduced in) the fluid. A variety of fluid filter (air or liquid filter) arrangements have been developed for contaminant rejection. However, continued improvements are sought.

SUMMARY

According to the present disclosure, features useable in preferred filter cartridges, such as air filter cartridges are provided. The features can be used together to provide a preferred filter cartridge, however some advantageous cartridges can be constructed to use only selected ones of the features. In addition, methods of construction and use are provided.

A typical preferred filter cartridge according to the present disclosure includes a coiled media combination and a cured-in-place jacket. The coiled media combination preferably comprises a coiled arrangement of a fluted sheet secured to a facing sheet, most preferably with a facing sheet directed to the outside. The coiled media generally defines an outer side wall extending between first and second, opposite, flow ends of the coiled media combination.

The cured-in-place jacket preferably completely circumscribes and covers the outer sidewall over an extension of at least 80% of a distance of outer side wall extension between the first and second flow ends, more preferably at least 95% of that distance and most preferably entirely over that distance. The cured-in-place jacket preferably is configured to seal an outer or tail end of the media combination.

In some instances, the filter cartridge includes a mold-in-place center piece or core. In some instances, when used, the mold-in-place center piece or core includes concave ends which each define a seal region positioned to seal a portion of an inner or lead end of the coiled media combination.

An example air filter cartridge utilizes both a cured-in-place jacket and a mold-in-place center piece or core.

The cured-in-place jacket preferably comprises a mold-in-place overmold which includes, integrally therein, a housing seal arrangement. A typical housing seal arrangement is an axial pinch seal.

Typically, polyurethane is a preferred material for the overmold, the housing seal and the mold-in-place center core. Most preferably it is as a foamed polyurethane.

Mold arrangements and techniques for providing preferred assemblies are provided.

DETAILED DESCRIPTION

I. Z-Filter Media Configurations, Generally

Figure 1:
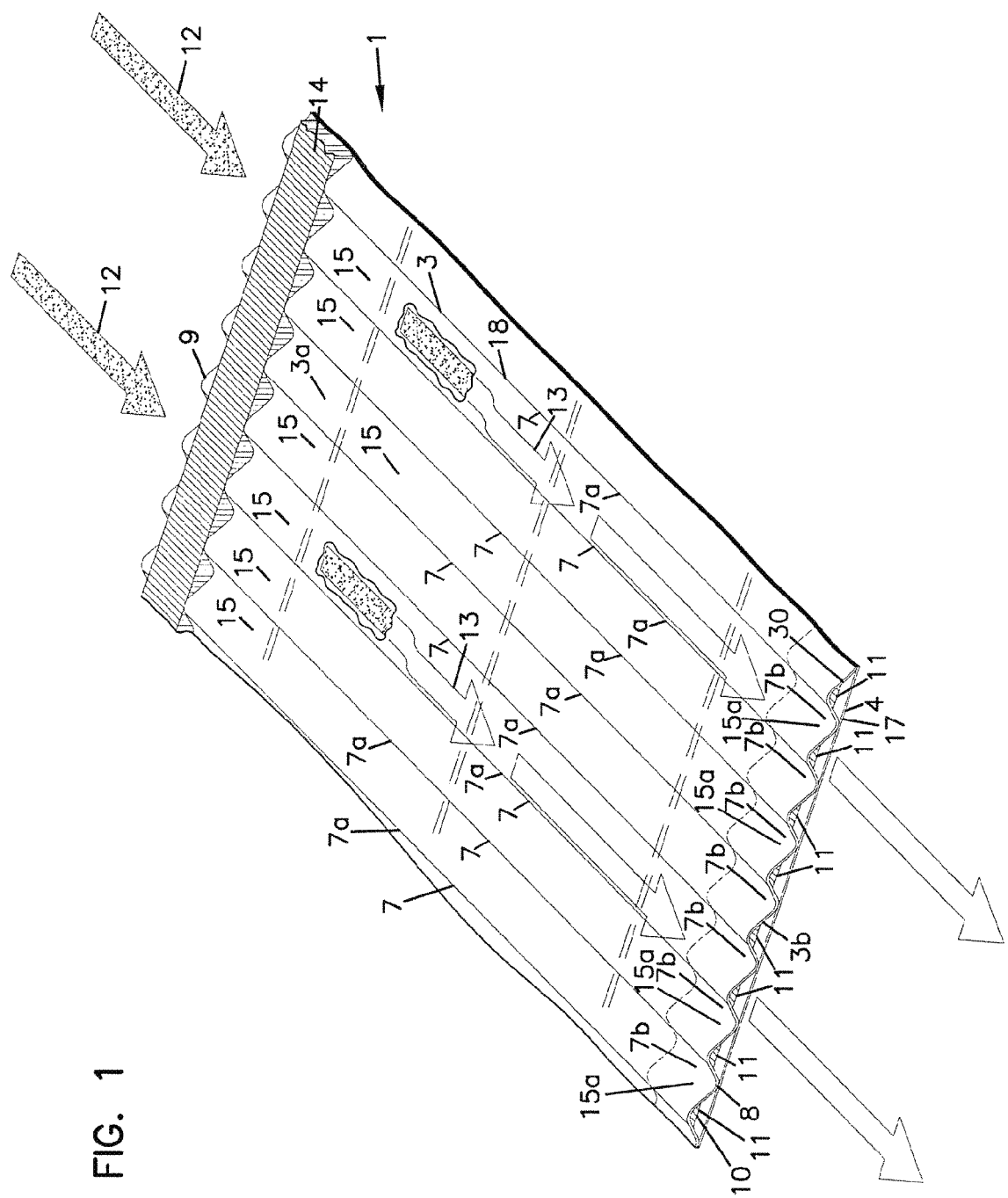
FIG. 1 is a fragmentary, schematic, perspective view of z-filter media useable in arrangements according to the present disclosure.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference. Herein, the facing sheet may sometimes be characterized as flat, if it is non-corrugated and non-fluted, even when it is coiled in the filter media construction.

The fluted (typically corrugated) media sheet and the facing media sheet together, are used to define media having parallel inlet and outlet flutes. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of corrugated media secured to flat media, are stacked on one another, to create a filter construction. An example of this is described in FIG. 11 of U.S. Pat. No. 5,820,646, incorporated herein by reference.

For specific applications as described herein, coiled arrangements are preferred.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid cleaner. In some instances, each of the inlet flow end and outlet flow end will be generally flat or planar, with the two parallel to one another. However, variations from this, for example non-planar faces are possible. Examples of non-planar, opposite, flow faces are described below.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to allow for definition of inlet and outlet flutes; or, such a media coiled or otherwise constructed or formed into a three dimensional network of inlet and outlet flutes; and/or, a filter construction including such media.

In FIG. 1, an example of media 1 useable in z-filter media is shown. The media 1 is formed from a corrugated sheet 3 and a facing sheet 4.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70%, typically at least 80% of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

Adjacent edge 8 is provided a sealant bead 10, sealing the corrugated sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

Adjacent edge 9, is provided seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Figure 2:
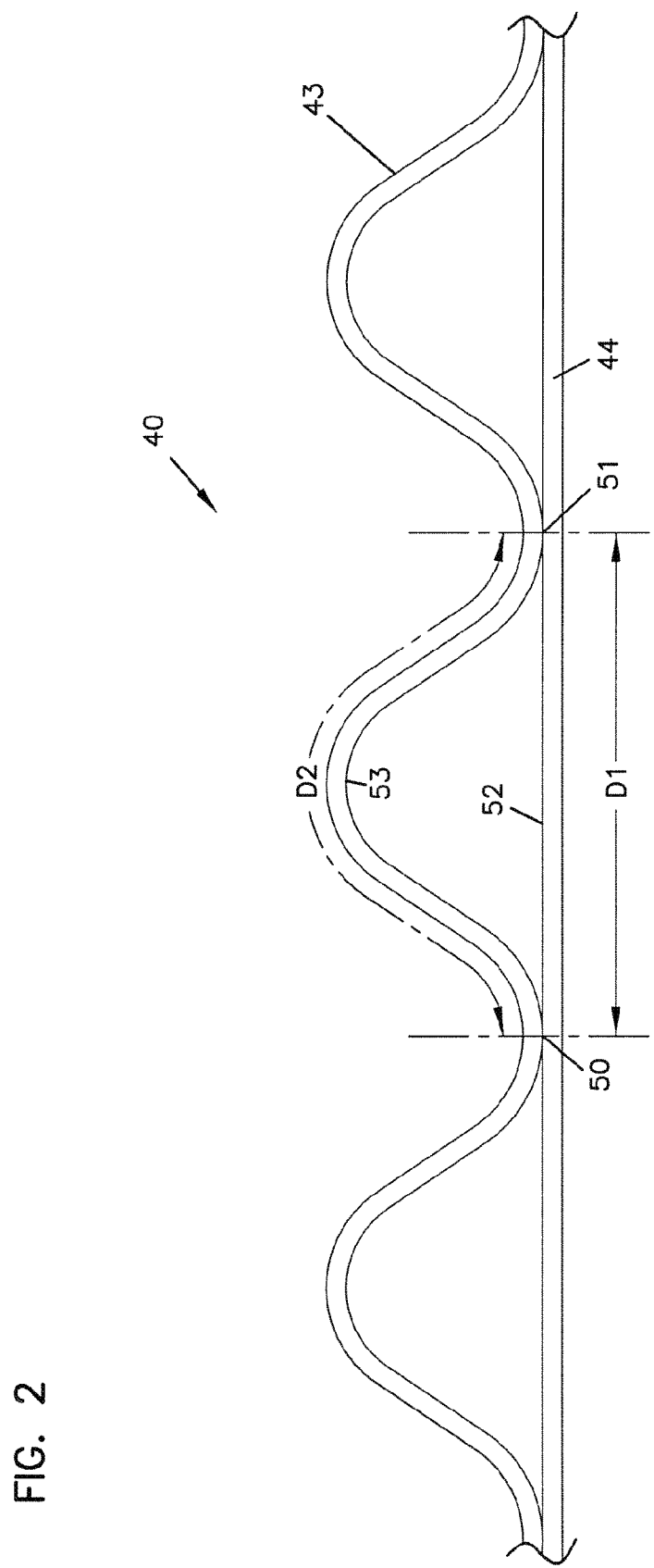
FIG. 2 is a schematic, cross-sectional view of a portion of the media depicted in FIG. 1.

Attention is now directed to FIG. 2, in which a z-filter media construction 40 utilizing a regular, curved, wave pattern corrugated sheet 43, and a non-corrugated flat sheet 44, is depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
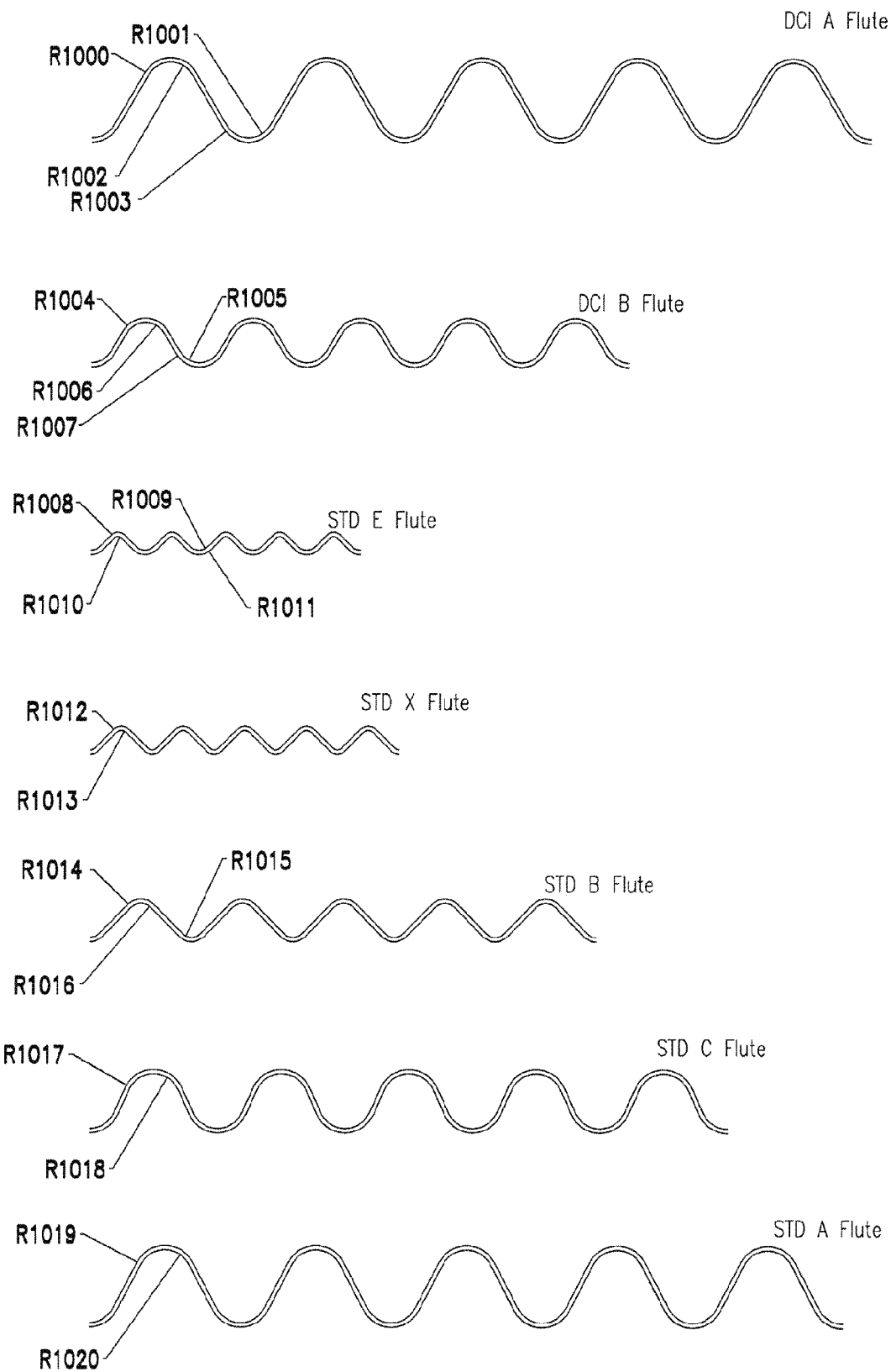
FIG. 3 is a schematic view of examples of various corrugated media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows:<br>R1000 = .0675 inch (1.715 mm); R1001 = .0581 inch (1.476 mm);<br>R1002 = .0575 inch (1.461 mm); R1003 = .0681 inch (1.730 mm); |
| DCI B Flute: | Flute/flat = 1.32:1; The Radii (R) are as follows:<br>R1004 = .0600 inch (1.524 mm); R1005 = .0520 inch (1.321 mm);<br>R1006 = .0500 inch (1.270 mm); R1007 = .0620 inch (1.575 mm); |
| Std. E Flute: | Flute/flat = 1.24:1; The Radii (R) are as follows:<br>R1008 = .0200 inch (.508 mm); R1009 = .0300 inch (.762 mm);<br>R1010 = .0100 inch (.254 mm); R1011 = .0400 inch (1.016 mm); |
| Std. X Flute: | Flute/flat = 1.29:1; The Radii (R) are as follows:<br>R1012 = .0250 inch (.635 mm); R1013 = .0150 inch (.381 mm); |
| Std. B Flute: | Flute/flat = 1.29:1; The Radii (R) are as follows:<br>R1014 = .0410 inch (1.041 mm); R1015 = .0310 inch (.7874 mm);<br>R1016 = .0310 inch (.7874 mm); |
| Std. C Flute: | Flute/flat = 1.46:1; The Radii (R) are as follows:<br>R1017 = .0720 inch (1.829 mm); R1018 = .0620 inch (1.575 mm); |
| Std. A Flute: | Flute/flat = 1.53:1; The Radii (R) are as follows:<br>R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

II. Manufacture of Coiled Media Configurations Using Fluted Media, Generally

A. Overview of Process; Option of Darting Flutes

Figure 4:
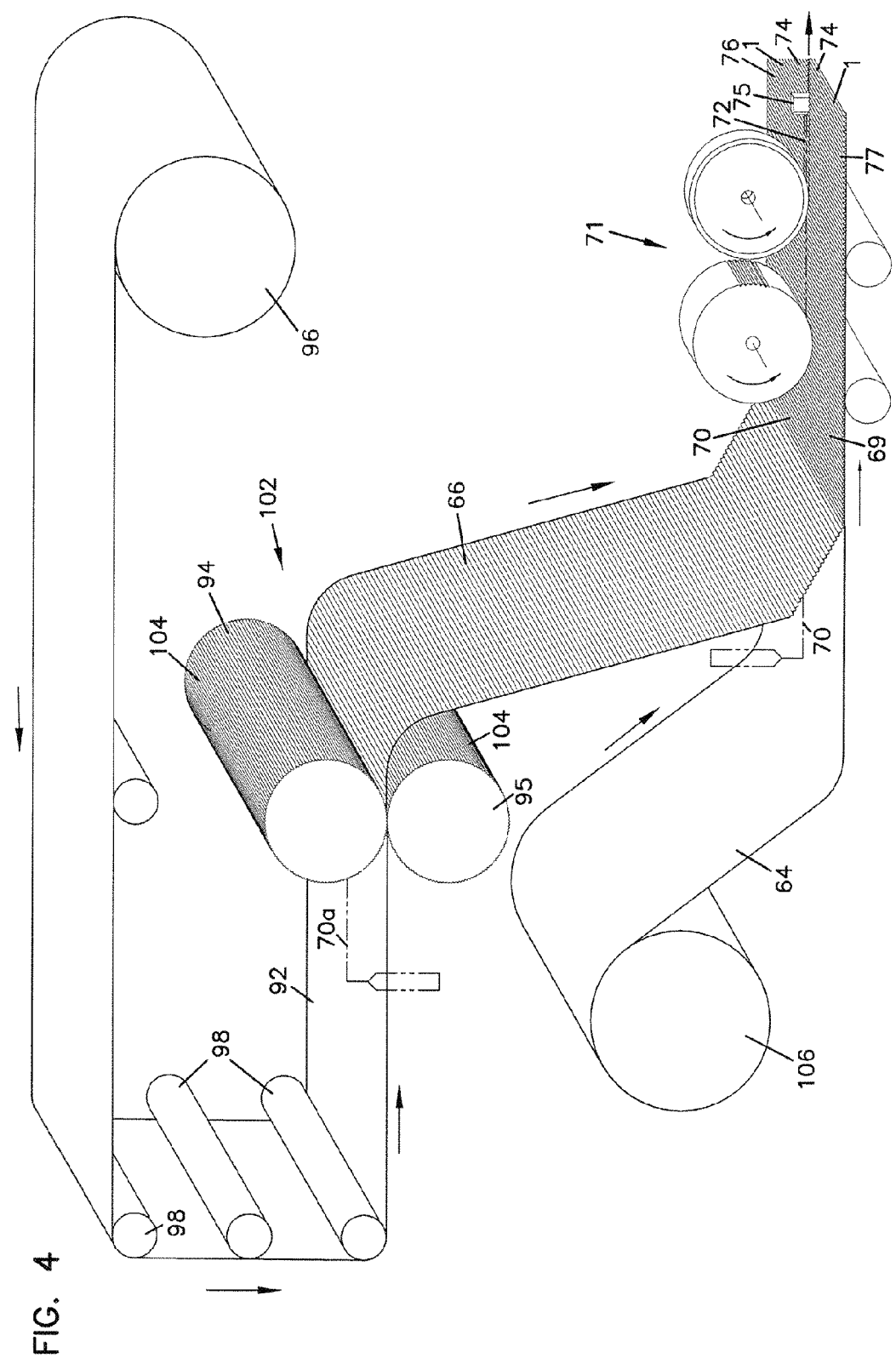
FIG. 4 is a schematic view of a process for manufacturing media according to the present disclosure.

In FIG. 4, one example of a manufacturing process for making a media strip corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a flat sheet of media 92 through a pair of corrugation rollers 94, 95. In the schematic shown in FIG. 4, the flat sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the flat sheet 92 becomes corrugated and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 are secured together by adhesive or by other means (for example by sonic welding).

Referring to FIG. 4, an adhesive line 70 is shown used, to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

The type of corrugation provided to the corrugated media is a matter of choice, and will be dictated by the corrugation or corrugation teeth of the corrugation rollers 94, 95. One preferred corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In one preferred application, typically D2=1.25–1.35×D1. In some instances the techniques may be applied with curved wave patterns that are not "regular," including, for example, ones that do not use straight flutes.

Figure 5:
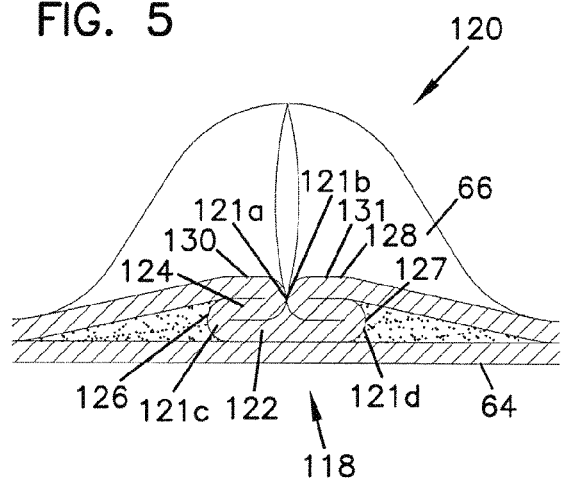
FIG. 5 is a cross-sectional view of an optional end dart for media flutes useable in arrangements according to the present disclosure.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004, incorporated herein by reference.

Techniques described herein are particularly well adapted for use in media packs that result from coiling a single sheet comprising a corrugated sheet/facing sheet combination, i.e., a "single facer" strip. Certain of the techniques can be applied with arrangements that, instead of being formed by coiling, are formed from a plurality of strips of single facer.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927.

Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, such as those described in FIGS. 6 and 15 below, the ends are generally flat and perpendicular to one another. In other arrangements, described generally with respect to FIGS. 11-14 below, the end faces include tapered, coiled, stepped portions which can either be defined to project axially outwardly from an axial end of the side wall of the media pack; or, to project axially inwardly from an end of the side wall of the media pack. These possibilities are described in more detail below.

The flute seals (single facer bead, winding bead or stacking bead) can be formed from a variety of materials. In various ones of the cited and incorporated references, hot melt or polyurethane seals are described as possible for various applications.

III. Formation of Seal Lead and Tail Ends; Generation of a Preferred Media Pack Housing Seal Arrangement

A. Background

The techniques described herein are typically used for provision of a serviceable air filter cartridge. The term "serviceable" in this context, is meant to refer to an air filter cartridge which is used as a replacement part or service item in an air cleaner. The terms "replacement part," "service item" and variants thereof are meant to refer to a filter cartridge which periodically is removed and replaced.

In general, preferred formation of a serviceable filter cartridge using z-filter media in accord with the present disclosure involves:

1. Generating a coiled z-filter media strip in general accord with the techniques described above in Sections I and II; and, 2. Incorporating the resulting media coil into a filter cartridge having: (a) a housing seal arrangement thereon; and (b) a lead end seal and a tail end seal for the media pack.

A housing seal is a seal incorporated into the resulting filter cartridge which is positioned to form a seal with an air cleaner housing, when the filter cartridge is operably installed in the air cleaner for use. The term "housing seal" derives from the fact that the seal is between the filter cartridge and a housing component. The term "housing seal" is used to distinguish internal media pack seals (flutes seals) and other media seals (lead end and tail end seals, for example) within the media pack.

Flute seals have been previously discussed above in connection with FIGS. 1-5. In general flute seals are seals that either: close the outlet flutes adjacent the inlet end or face of the media pack; or, close the inlet flutes adjacent the outlet end or face of the media pack.

In general terms, a lead end seal for a media coil is a seal across a lead end of the coiled strip of z-filter media, typically extending parallel to the flutes. In this context, the term "lead end" is meant to refer to an end of the single facer or corrugated sheet/facing sheet combination which begins the coil, and thus is located inside of the center of the resulting media coil after coiling. In typical arrangements, two locations of seal at the lead end are potentially important namely: (1) a seal between the corrugated sheet and facing sheet of the single facer, across the lead end and parallel to the flutes; and, (2) sealing of the lead end of the single facer against a next outer layer, wrap or coil of the single facer as it is coiled around, again across the lead end and parallel to the flutes.

Analogously, the tail end seal is a seal across the media strip (single facer), typically parallel to the flutes, at the tail or rear end of the media strip (single facer) which is coiled. The tail end seal is at the outside of the coil. Analogously to the lead end seal, the tail end seal has two potentially important components namely: (i) a seal across the tail end between the facing sheet and the corrugating sheet of the coiled single facer; and, (ii) a seal between the end of the single facer and the next inner layer, wrap or coil inside of the tail end.

In general terms, in preferred arrangements according to the present disclosure these seal features are accommodated in the following manner:

1. The lead end seal is formed by a process involving providing a mold-in-place preferred center piece or core in the single facer coil;

2. The tail end seal is provided by applying a curable resin around the media pack (i.e., circumscribing the media pack) to form a cured-in-place coating to engulf the otherwise exposed facing sheet and tail end of the coiled strip; and 3. The housing seal is molded to the media pack and resin coating, preferably integral with the cured-in-place coating.

Herein when it is said that one component is integral with another, without more, it is meant that they are not separable from one another without destruction or damage. When it is said that they are molded integral, or integrally molded, it is meant they are molded together, at the same time, from the same resin pool.

Preferably the housing seal and resin coat are molded together, as a mold-in-place overmold directly applied around the media pack, as described below. These features can be accommodated in arrangements of various shapes, also as explained below.

B. An Example of Cylindrical Arrangement, FIGS. 6-10

Figure 6:
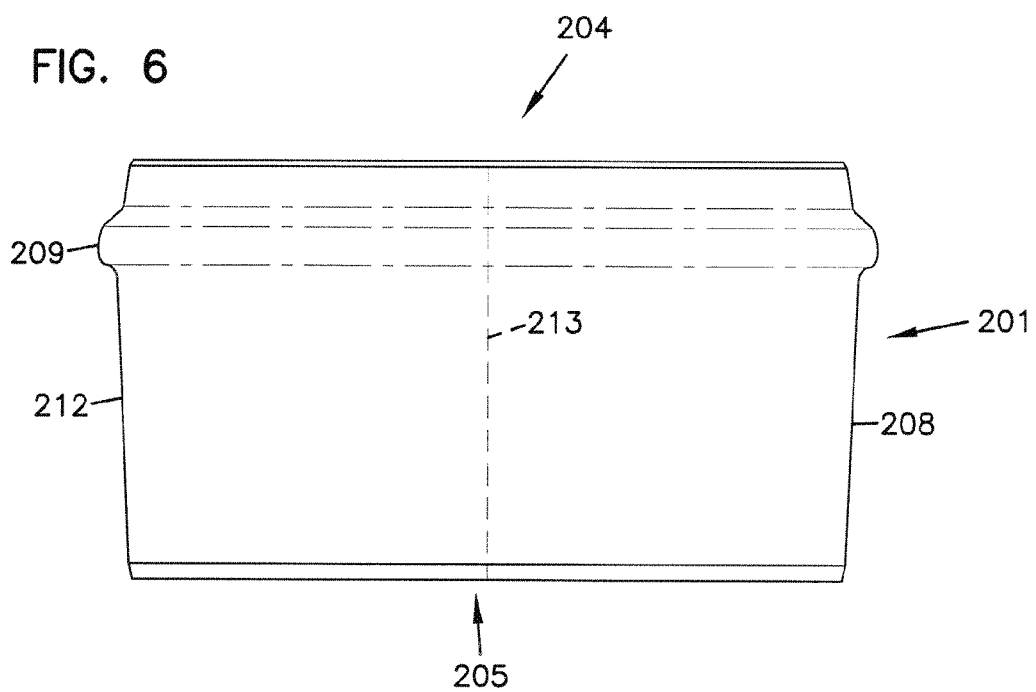
FIG. 6 is a side, elevational view of a filter cartridge according to the present disclosure.
Figure 7:
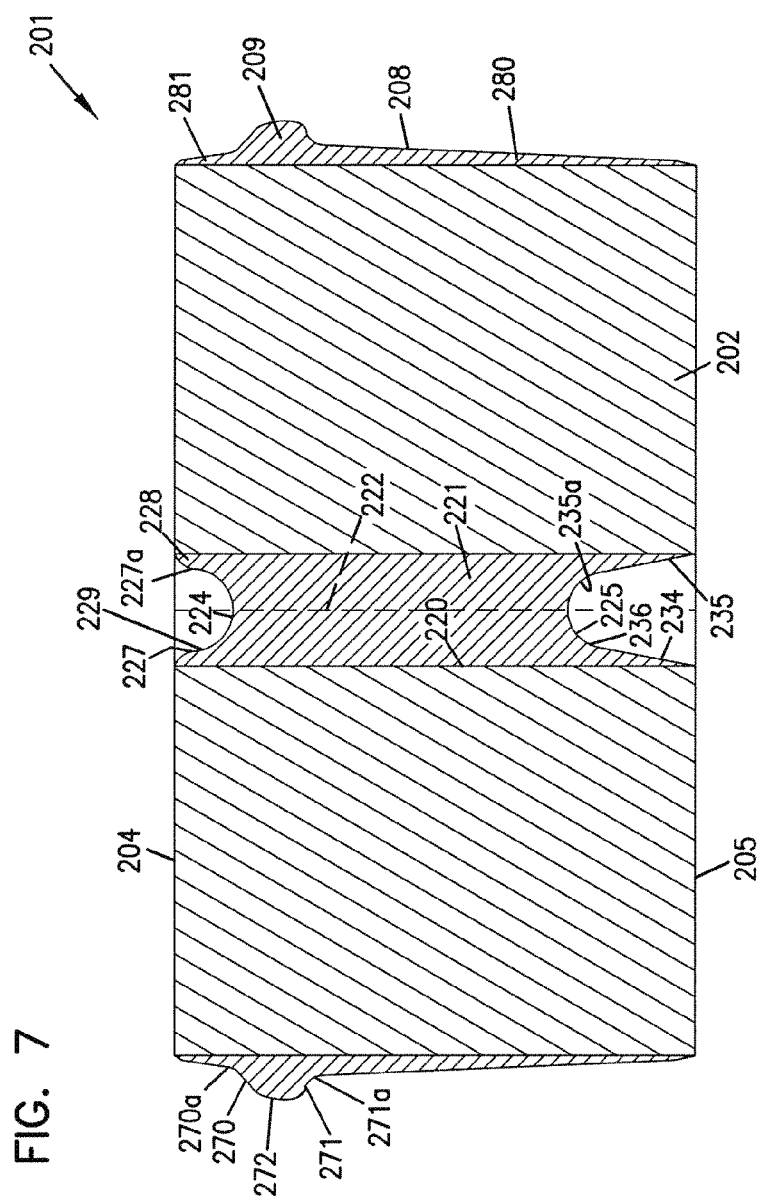
FIG. 7 is a cross-sectional view of the element depicted in FIG. 6.
Figure 8:
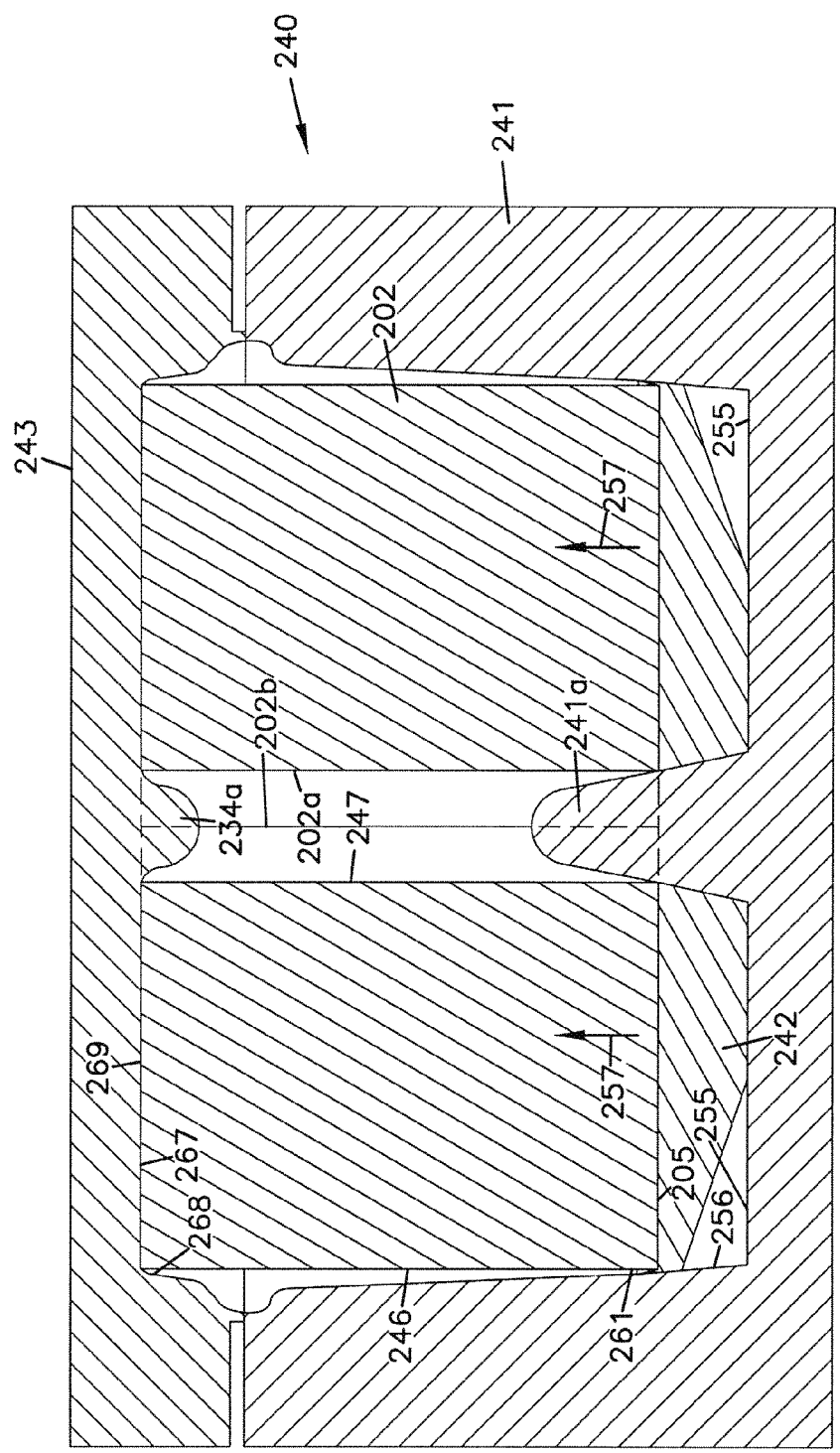
FIG. 8 is a schematic view of a mold arrangement having a media pack therein, for forming the filter cartridge of FIG. 6.
Figure 9:
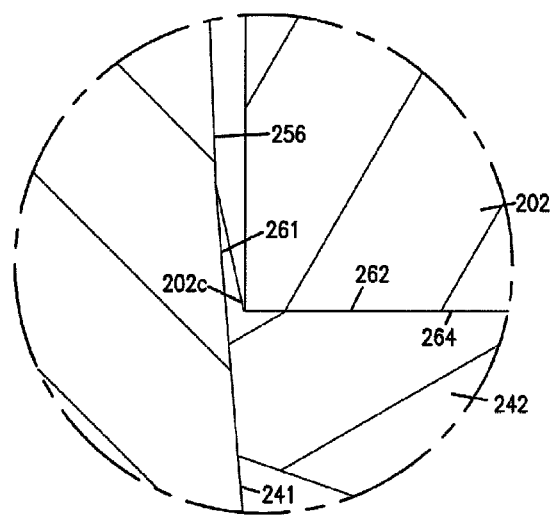
FIG. 9 is an enlarged, fragmentary view of a first portion of the mold arrangement of FIG. 8.
Figure 10:
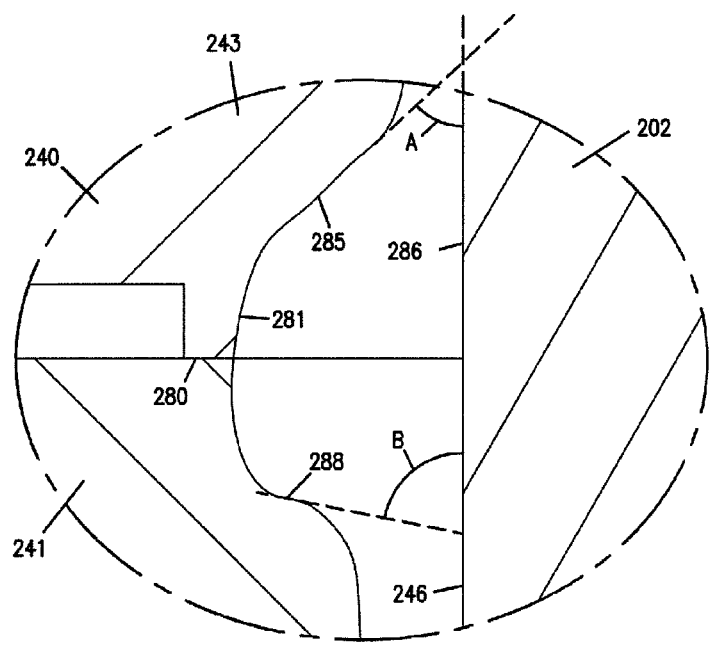
FIG. 10 is an enlarged, fragmentary view of the second portion of the mold arrangement of FIG. 8.

In FIG. 6, a filter arrangement according to the present disclosure is depicted. In FIG. 7 a cross-sectional view of the arrangement of FIG. 6 is depicted. In FIG. 8 a cross-sectional view of a mold arrangement having a media pack therein useable to form the arrangement of FIG. 6 is depicted. FIGS. 9 and 10 are enlargements of portions of FIG. 8.

Referring to FIG. 6, in general filter cartridge 201 is depicted. The filter cartridge 201 comprises a coiled media pack of z-filter media 202 (FIG. 7) positioned with opposite flow surfaces 204 and 205, and with a cured resin jacket 208 around the media pack 202 (FIG. 7) in extension between the faces 204 and 205. Secured to an outer portion of the media pack 202 is a housing seal arrangement 209.

Although alternatives are possible, for the particular arrangement 201 shown, the cured resin jacket 208 and housing seal arrangement 209 are preferably integral with one another, the two jointly forming overmold 212. The overmold 212 is preferably molded-in-place from a polyurethane material suitable for forming the housing seal arrangement 209. Preferably a material which cures to an as-molded density of no greater than 30 lbs/cubic foot, typically no more than 25 lbs. per cubic foot, more preferably no greater than 22 lbs/cubic foot is used, although alternatives are possible, as discussed in section IV below. An example of a useable polyurethane material is described for example in U.S. application Ser. No. 10/112,097, filed Mar. 28, 2002, the complete disclosure of which is incorporated herein by reference. Although alternatives are possible, preferably the polyurethane overmold is cured to a hardness, Shore A, of no greater than 30, more preferably no greater than 25, typically no greater than 20, for example 12-20.

Preferably the overmold 212 extends axially a distance of at least 80% of a length between the opposite flow faces 204 and 205. More preferably it extends at least 90% of this distance, still more preferably at least 95% and most preferably at least 98% up to 100% of this distance. In some instances instead of providing a complete overmold, one can provide a partial overmold which aligns with the portions of the winding bead and/or a single facer bead, to complete the sealing function.

In general, when applied as an overmold from a mold-in-place process, the overmold 212 seals the tail end seal 213, as discussed above, along any portion of the tail end 213 that is underneath the overmold 212. A reason is that the tail end 213 of the coiled media strip becomes engulfed within the cured resin jacket 208, during the molding process.

Attention is now directed to FIG. 7, which depicts filter cartridge 201 in cross-section. Referring to FIG. 7, the coiled media pack 202 includes center 220. The center 220 needs to be sealed against air flow therethrough. This is done by center piece or core 221. Core 221 also provides for a lead end seal.

More specifically, the media lead end is shown in phantom at 222. In particular, for the arrangement shown, between regions 224 and 225, the mold-in-place core 221 is provided in center 220. Thus, it seals at least a portion of the lead end 222 of the media strip.

Still referring to FIG. 7, in general the preferred core 221 is a poured and cured core. By this it is meant that the core 221 results from pouring a fluid resin into center 220 and allowing the resin to cure. A variety of shapes and sizes for the core 221 are possible.

Typically when used as a lead end seal, the core 221 will be configured to extend along, or engulf, at least 80% of the lead end seal length, typically at least 90% of that length. In some instances, for example in the instance shown in FIG. 7, the core 221 may be configured to cover or enclose the entire lead end 22.

The core 221 can be configured with recesses as shown, or it can be configured to have no recesses or even to have one or more projections extending outwardly from the element.

When the core 221 is provided with recesses as shown, typically region 224 will be spaced from end 204 at least 2 mm, and region 225 will be spaced from end 205 by at least 2 mm.

Region 227 extends from region 224 toward face 204, and terminates at face 204 as shown, or spaced therefrom within a preferred distance. This region defines an outer seal wall 228 with a hollow center 229. The seal wall 228 continues the sealing of the lead end 222 of the media pack 202. Region 227 can be viewed as a concave end 227a to core 221. The hollow 229 is useable as described below. Herein, region 227 will sometimes be referred to as a concave end 227a with an axially outwardly projecting end skirt 228.

Skirt 228 is not required to terminate at end face 204, although such termination is shown in the preferred embodiment of FIG. 7. It can terminate short thereof and can still accomplish much of its function of sealing the lead end 222, for example, by terminating at or adjacent the winding bead seal or single facer seal in this region.

Analogously, between region 225 and surface 205, region 234 is provided, with outer seal area 235 and inner center recess 236. The seal area 235 provides, among other things, for sealing of the lead end 222 of the media 202 between region 225 and surface 205. The seal area 235 can be seen as a concave end 235a to core 221. Herein, region 225 will sometimes be referred to as a concave end 235a with an axially outwardly projecting end skirt 235. In some instances end skirt 235 is not required to terminate adjacent end face 205, as shown in the preferred embodiment of FIG. 7. Rather skirt 235 can terminate short of end face 205, and still accomplish an appropriate seal of the lead end 222 at this location, by terminating adjacent or in cooperation with a winding bead or seal bead at this location.

Still referring to FIG. 7, concave regions 227a and 235a are configured for receipt of housing componentry therein, when installed. This componentry can project into the element 201, into engagement with regions 235a and 227a, to support the cartridge 201 within the housing. In addition, concave regions 235a and 227a result from a preferred molding approach as described below.

Still referring to FIG. 7, although not shown, structure could be embedded within core 221. For example a hollow core or other structure from a winding process could be left within region 220, to be engulfed within core 221 as a result of the molding operation.

Attention is now directed to FIG. 8, which shows a cross-sectional view of a molding process to form filter cartridge 1. Referring to FIG. 8, mold arrangement 240 includes mold base 241 with center post 241a, slideable end pad 242 and cover 243, with center post 243a.

In operation, a media coil 202 is positioned in mold base 241 against slideable end pad 242 with post 241a projecting into a center 202a of coil 202. Curable resin is then positioned within cavities 246, 247 and mold cover 243 is put in place, with post 243a projecting into center 202a of coil 202. Although not required in all applications, the resin (typically a polyurethane) will typically be chosen to rise a selected amount during cure, typically being chosen to increase by volume by at least 20%, usually at least 40% and often a selected amount of greater than 50%. Indeed in some instances an increase in volume of 100% or more, is conducted. There is no general requirement that the same resin be used to form both the core and the overmold, although in some instances the same resin could be used at both locations.

The post 241a is configured to form region 225 at seal area 235, when resin is positioned in region 241, before mold cover 243 is put in place. Mold cover 243 includes projection 243a which forms region 224 and seal region 228, FIG. 7, when the resin in region 250 rises and cures. Typically resin for cure will be dispensed in region 241, then, before mold cover 243 is put in place. The resin, of course, will seal lead end 202b after cure.

As configured, post 243a engages media coil 202, to inhibit undesirable levels of resin flash from extending over surface 204, FIG. 7, during cure. Similarly post 241a in cooperation with engagement of media coil 202 inhibits undesirable levels of resin flash extending over surface 205, FIG. 7, during cure.

The coil 245 will be positioned in mold arrangement 250 with the winding bead positioned either adjacent cover 243 or base 241. The choice will depend on specific features of the mold, and which end of the final product is selected for the seal bead.

Of course resin positioned in cavity 246 will form overmold 208 and housing seal portion 209, FIGS. 6 and 7.

Slideable end pad 242, FIG. 8, facilitates demolding. In particular, pocket 255 circumscribes post 241a underneath a portion of pad 242 at a region adjacent base outer wall 256. The mold arrangement 240 will typically be constructed such that compressed air can be selectively driven into pocket 255, once mold cover 243 is removed, to drive slideable base 241 in the direction of arrows 257, pushing the resulting molded cartridge (cartridge 201, FIG. 6) out of the mold arrangement 240.

Attention is now directed to FIG. 9, which shows an enlarged view of a portion of FIG. 8. In FIG. 9, an interface between mold base 241, slideable end pad 242 and media coil 202, adjacent base outer wall 256 is shown. For the particular arrangement shown, slideable end pad 242 includes circumferential projection 261 which tapers to a thin edge in extension from surface 262 around media coil 202. Pushing the media coil 202 into circumferential projection 261, will help ensure that resin does not undesirably flash across end face 264, during molding. It also will facilitate demolding. Projection 261 can be configured to prevent resin from engaging the media coil 202 at region 202c. However in typical applications, a small amount of resin flash will be able to creep over media 202 at region 202c, i.e., the pressing will not be so tight as to prevent this.

Referring to FIG. 8, adjacent surface 267 of mold cover 243 a similar tapered area 268 is provided, to inhibit flash across surface 269 during molding. Again, although pinching at region 268 can be conducted such as to prevent resin from extending all the way to adjacent surface 269, preferably the pinching is not so tight as to prevent resin extension from this location. A very small amount creep across to the surface 269, typically less than 5 mm, is acceptable. The same is true adjacent end 205.

Typically before the coil 202 is positioned within mold arrangement 240, the tail end of the coil 202 is taped or tacked down, so that it does not uncoil or open when positioned in the mold. In addition, or alternatively, pinching of the coil 202 at regions 261, 268, FIG. 8, will also tend to inhibit uncoiling.

In FIG. 10, there are shown, in enlarged view, portions of the mold arrangement 240 which form the housing seal arrangement 209, FIG. 7, of the resulting filter cartridge 201.

Referring to FIG. 7, the housing seal arrangement 209 has opposite generally axially directed surfaces 270, 271 separated by central peripheral region 272. In operation, housing seal 209 will be compressed between a first housing component directed into housing portion engaging surface 270 and an opposite housing portion engaging surface 271, under axial compression. In this context the term "axial" is generally meant to refer to forces in the direction of a longitudinal axis of the cartridge 201, or alternately stated in a direction generally corresponding to a line drawn between faces 204, 205. Such seals are generally referred to herein as "axial seals."

It is noted that surfaces 270 and 271 are each contoured, and are not flat and parallel to one another, in the preferred arrangement. Seals which have generally flat surfaces at these locations are possible, including ones where the surfaces are flat and parallel to one another.

Attention is now directed to FIG. 10, which shows the mold arrangement for forming housing seal 209.

Referring to FIG. 10, the break line between mold parts 241, 243 is shown at 280. It is noted that the break line is configured to engage in a central portion of surface 281 of a mold cavity. Surface 281 is the surface which will form peripheral region 272 of the housing seal arrangement 209, FIG. 7. Thus the mold line or mold break line does not engage either of the sealing surfaces 270 or 271, in the preferred embodiment.

Referring again to FIG. 10, at 285, the mold surface which will form seal surface 270, FIG. 7 is indicated. Surface 285 has several features of interest, in the preferred embodiment shown. First, surface 285 extends generally at an angle relative to surface 286 of the media pack 202) that is non-perpendicular to the surface 286, and generally is at an angle A, FIG. 10, within the range of 30°-70°, typically 40°-60°, preferably 45°-55°. Such a general angle helps ensure that as the resin material rises within the cavity 246, air bubbles will not form along surface 285, negatively affecting the mold in surface 270, FIG. 7.

In addition, surface 285 is not a straight surface, but is somewhat contoured as shown in FIG. 10, to result in a contoured surface 270, FIG. 7. A contouring can be used to provide for preferred engagement with a housing part.

Referring to FIG. 10, mold region 288 is configured to form seal surface 271, FIG. 7. At region 288 the mold surfaces closer to perpendicular to media surface 286. Specifically the example shown as an angle B of about 70°, with typical arrangements being 60°-85°, of course a perpendicular arrangement, with angle B being 90°, is possible.

Referring to FIG. 7, the resulting surface 271 has a shape or contour selected to be appropriate for engaging a housing component.

Still referring to FIG. 7, it is noted that cartridge 201 would typically be installed with surface 204 upstream and surface 205 downstream, although alternate mounting is possible.

Typically region 272 of housing seal 209 is positioned at a location outwardly (radially) from media pack 202 (before any compression or distortion) a distance of at least 5 mm, typically at least 10 mm. Typically an axial extension of surface 272, spacing surfaces 270, 271, is at least 4 mm, typically at least 6 mm (before any compression or distortion).

Referring to FIG. 7, typically point 270a, corresponding to a junction between surface 270 and a remaining of portion of overmold 208 is spaced from surface 204 a distance of at least 3 mm, typically at least 5 mm. Similarly point 271a, located at junction between surface 271 and a remainder of overmold 208 is spaced from surface 205 a distance of at least 3 mm, typically at least 5 mm. In usual examples, juncture 271a is spaced from surface 205 by a substantial distance corresponding at least 40% of an axial length of the cartridge 201.

Also referring to FIG. 7, it is noted that because the seal arrangement 209 is positioned spaced from both ends 204 and 205, two region 280, 281 of overmold are provided. Region 280 generally tapers downwardly in thickness, in extension from housing seal 209 toward end surface 205. The angle of inward taper is generally nor more than 10°, typically no more than 5°.

At region 281, the overmold extends downwardly at an angle and thickness, between housing seal 209 toward end surface 204. The angle of tapering is generally no more than 10°, typically no more than 5°.

It is not required that seal 209 be spaced both end surfaces 204, 205, this is a matter of choice for the particular arrangement constructed. However when housing seal 209 is spaced from both surface 204, 205, the extent of spacing is typically at least 10 mm and preferably at least 15 mm from each. Again, in some embodiments the housing seal 209 can be positioned flush with, or very close to, one of the end surfaces 204, 205.

It is noted that the identified overmold could be used in filter cartridge arrangements in which the central volume 220 and the lead end are sealed differently from the way shown in FIG. 7.

C. Bullet Nosed or Conical Version FIGS. 11-14

Figure 11:
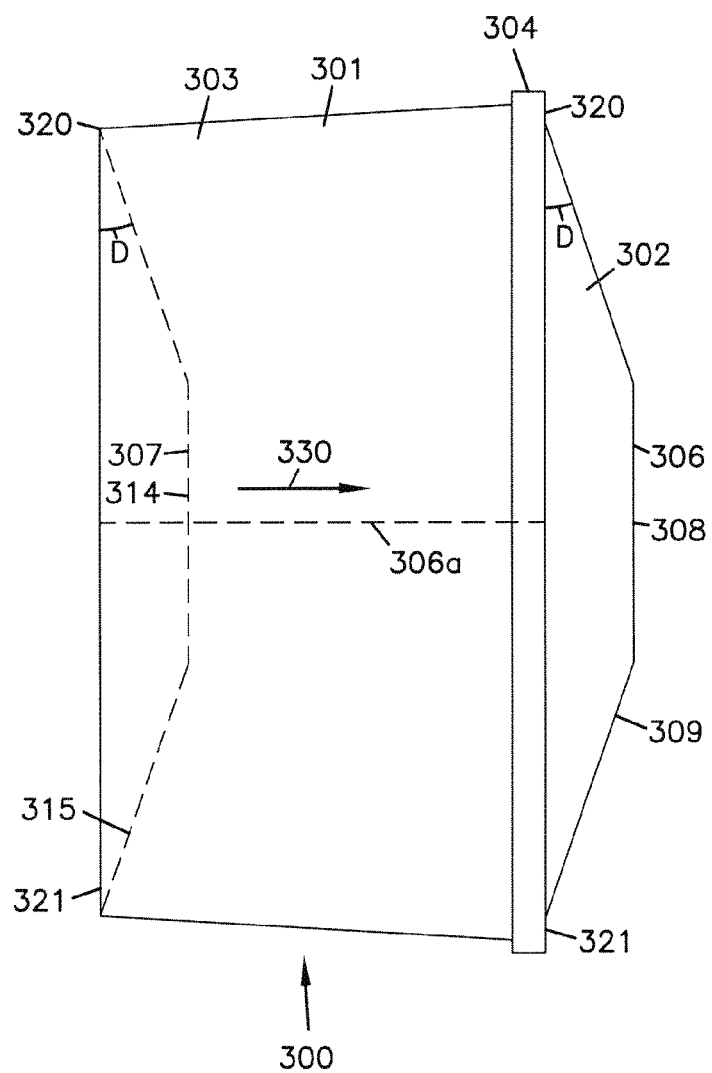
FIG. 11 is a schematic side elevational view of a second filter cartridge according to the present disclosure.
Figure 12:
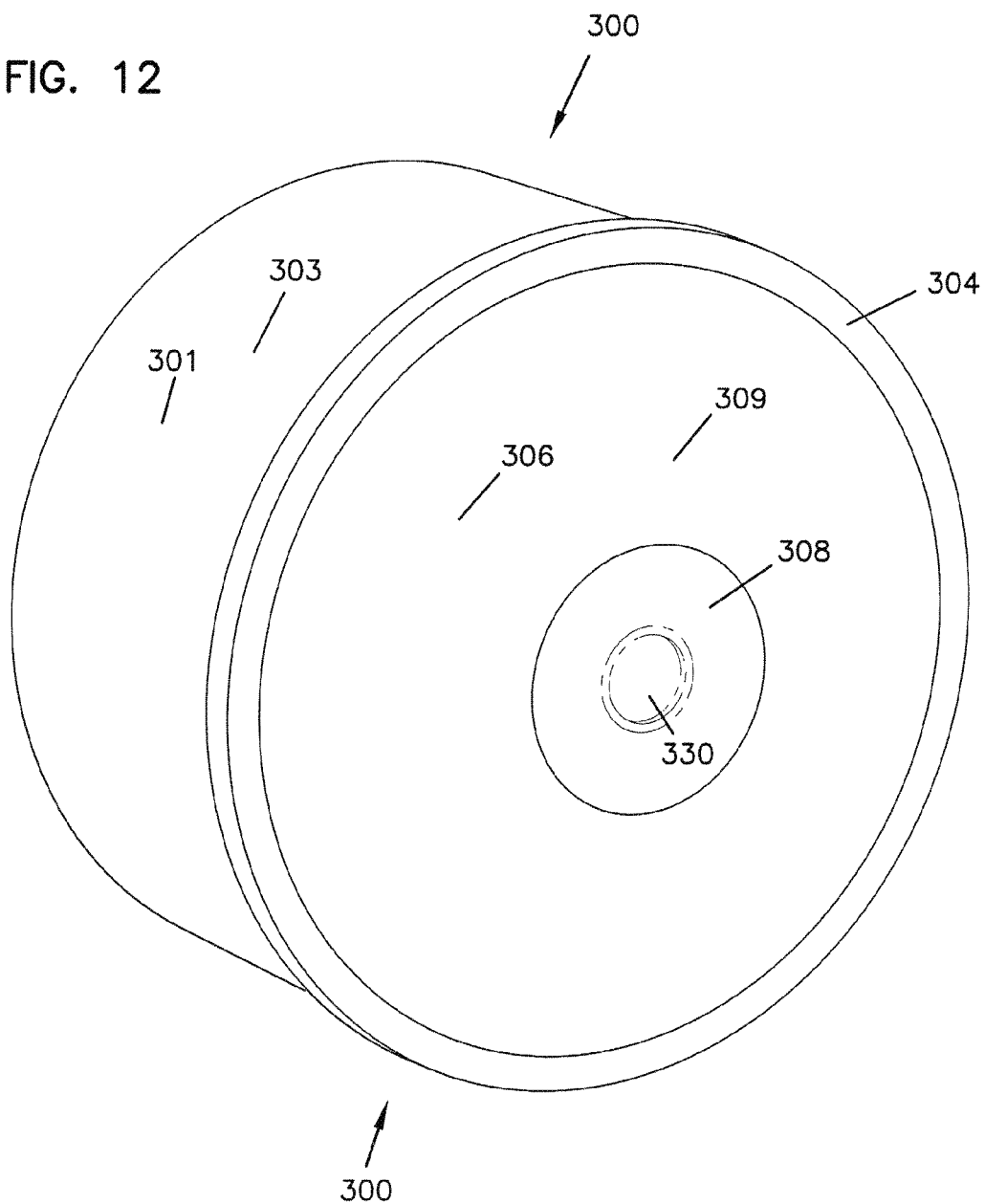
FIG. 12 is a perspective view of the filter cartridge depicted in FIG. 11.

Attention is now directed to FIGS. 11 and 12 in which filter cartridge 300 is schematically depicted. Referring to FIG. 11, the cartridge 300 includes an overmold 301 and a media pack 302. The overmold 301 comprises side wall section 303 and housing seal 304. In a typical arrangement the housing 304 would be integral with a side wall 303, both being formed in a single mold-in-place operation analogous to the one described above with respect to FIGS. 6-10.

The media pack 302 comprises a coiled single facer arrangement configured to have one axially outwardly projecting end or flow surface 306 and one inwardly axially projecting end or flow surface 307. Referring to FIG. 11, surface 306 includes central planar portion 308 and outer sloped portion or surface (skirt) 309. It is noted that in a typical arrangement sloped surface (skirt) 309 would not be a perfect straight line, but would rather comprise a series of coiled steps resulting from coiled layers of media single facer. Typically face 307 would have an analogous surface with central portion 314 and outer angular skirt 315.

In typical arrangements the center portion 306 will comprise at least 20%, for example 20 to 60% inclusive; typically 30-50%, inclusive, of the total distance across the cartridge 300 between regions 320, 321; the distance between regions 320 and 321 being a largest axial cross-section corresponding to a diameter of the media pack, for a media pack having a circular outer periphery.

The same would be true for center section 314. That is, center section 314 preferably extends at least 20%, for example 20%-60%, inclusive typically 30-50%, inclusive of the total distance of a largest axial cross-section of the cartridge 300 between regions 320, 321; the distance between regions 320 and 321 being a largest axial cross-sectional corresponding to a diameter of the media pack, for a media pack having a circular outer periphery.

Angles D, FIG. 11, generally define a "skirt angle" for regions 309, 315. These angles D indicate the extent to which regions 309 and 315 are conical. Typically angle D will be at least 5° and not more than 40°, typically 10-30°, often 15-25°.

In general, the configuration of the media pack 302 results from pushing surface 307 in the direction of arrow 330 an appropriate amount, prior to molding overmold 301.

It is noted that the media pack 306 would typically require a center seal and lead end seal. A core analogous to the core 221 described above with respect to cartridge 201, FIG. 7 could be used, although alternatives are possible.

In FIG. 11, a tail end 306a of the media pack 306 is shown engulfed in the overmold 301.

For the particular arrangement shown in FIG. 11, the housing seal 304 is located adjacent surface 306 as opposed to spaced therefrom as shown for the arrangement of FIG. 6. An alternative in which the housing seal 304 is molded at a location spaced from surface 306 is, of course, possible.

In FIG. 12, element 300 is shown in perspective view and thus core 330 is viewable.

Of course as with FIGS. 6 and 7, FIGS. 11 and 12 are partially schematic, and thus individual coils of the media are not specifically depicted.

Figure 13:
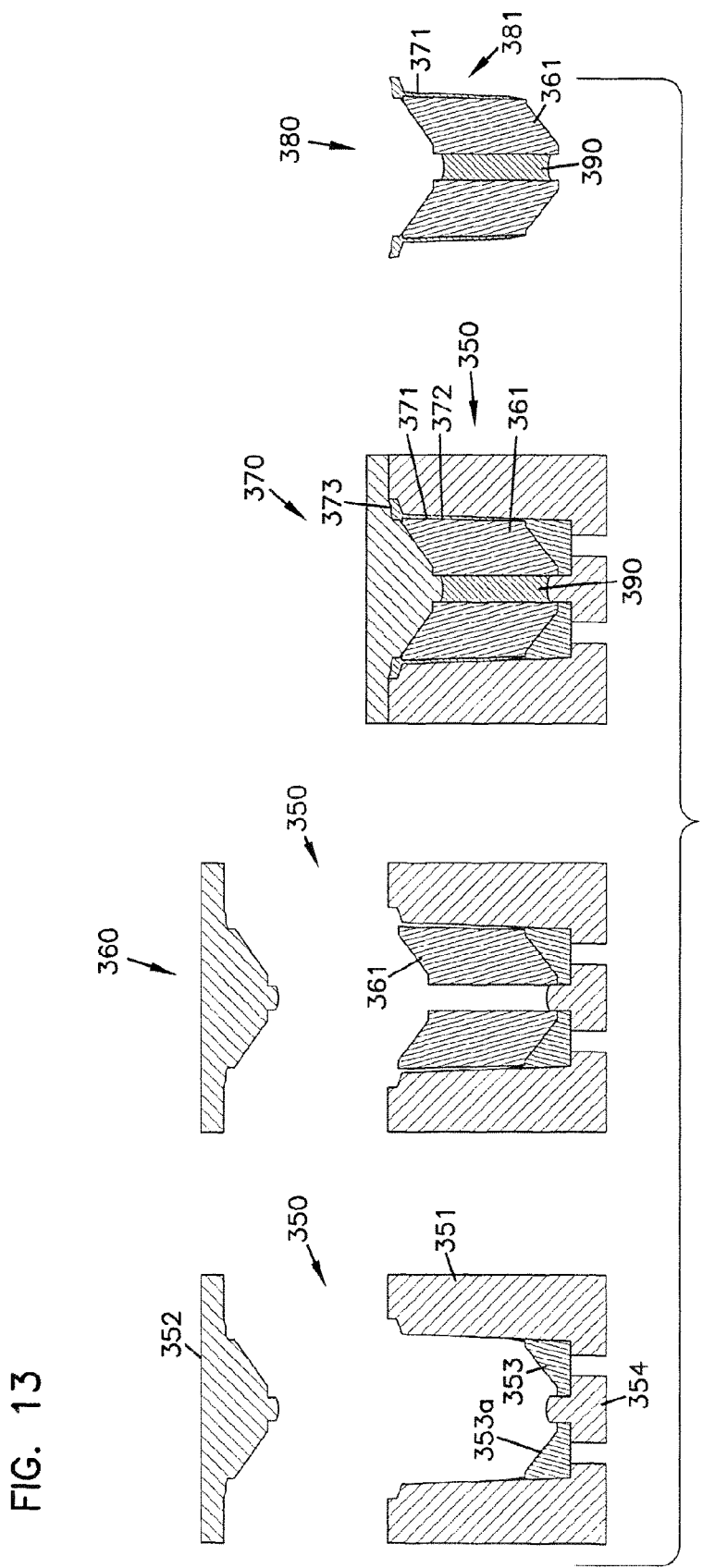
FIG. 13 is a schematic view of a process of forming an alternate filter cartridge according to the present disclosure.

Attention is directed to FIG. 13, which shows a general process for forming a conical or bullet nosed media pack having an overmold. Referring to FIG. 13 at 350 a mold arrangement comprising side wall 351, cover 352, base 353 and center piece 354 is depicted. Base 353 defines a slanted upper surface 353a.

At 360, mold 350 is shown having media pack 361 positioned therein. The media pack 361 would generally comprise a coiled media pack arrangement. Because it is pushed on base 353, it has adopted the conical (bullet nosed) arrangement or configuration. At 370, the mold 350 is shown closed, with resin therein to form overmold 371 around media pack 361. The resin is shown forming an overmold 372 with a housing seal 373 secured thereto.

At 380, the completed element 381 is shown. It is noted that core 390 was also formed during the molding at 370.

From FIG. 13, it can be understood that a variety of different shaped arrangements can be made, using the principles. Different configurations and different over molds are possible, by modification of the techniques.

Figure 14:
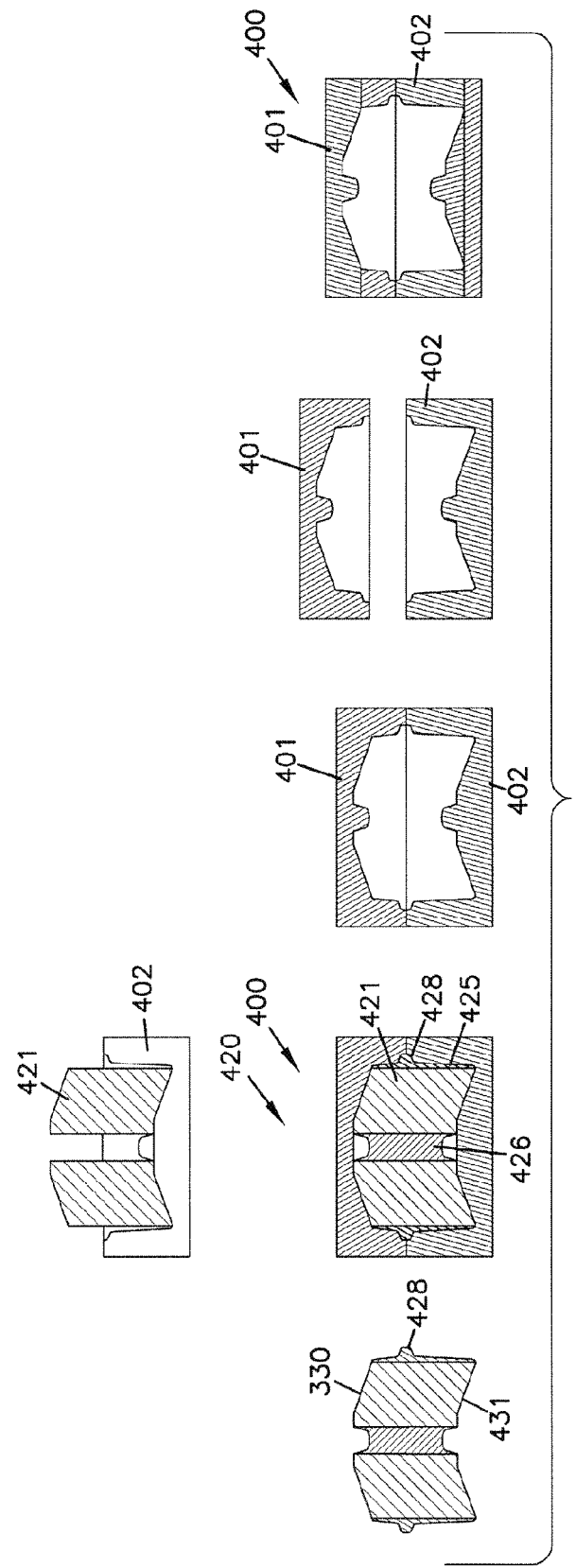
FIG. 14 is a schematic view of a second process for making an alternate filter cartridge according to the present disclosure.

One modification is depicted in FIG. 14. At 400 a mold arrangement is shown, comprising cover 401 and base 402. They are shown openable, for positioning in media pack therein. At 420, the mold 400 is shown with a media pack 421 therein, and resin positioned to provide overmold 425 and central core 426. The overmold 425 includes housing seal 428, in this instance positioned between end surfaces 430, 431, and spaced from each.

D. Obround Versions FIGS. 15-19

Figure 15:
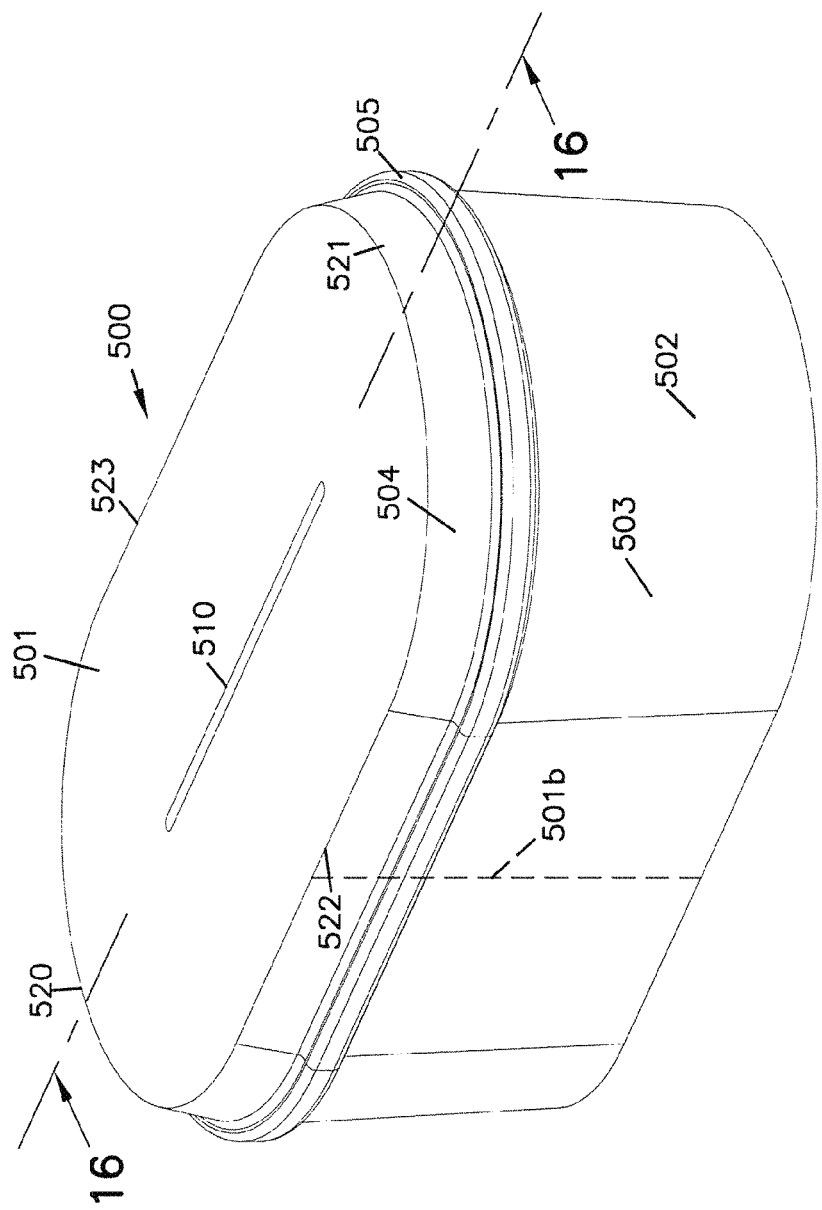
FIG. 15 is a perspective view of an obround filter cartridge having features according to the present disclosure.

Referring to FIG. 15, an obround filter cartridge 500 is depicted. The cartridge 500 comprises a media pack 501 and an overmold 502. The overmold 502 includes side wall portions 503, 504 and housing seal 505. Preferably the portions 503, 504, 505 comprise an integrally molded overmold 502, which seals tail end 501b of media pack 501. Cartridge 501 includes center core 510. Preferably the center core 510 is molded analogously to core 221, FIG. 7.

In general the media pack 501 has a generally oval perimeter shape, with opposite curved ends 520, 521 and opposite sides 522, 523. For the particular arrangement shown, the shape is racetrack with center portions of sides 522 and 523 being straight and parallel to one another. Of course curved sides can be used.

Figure 16:
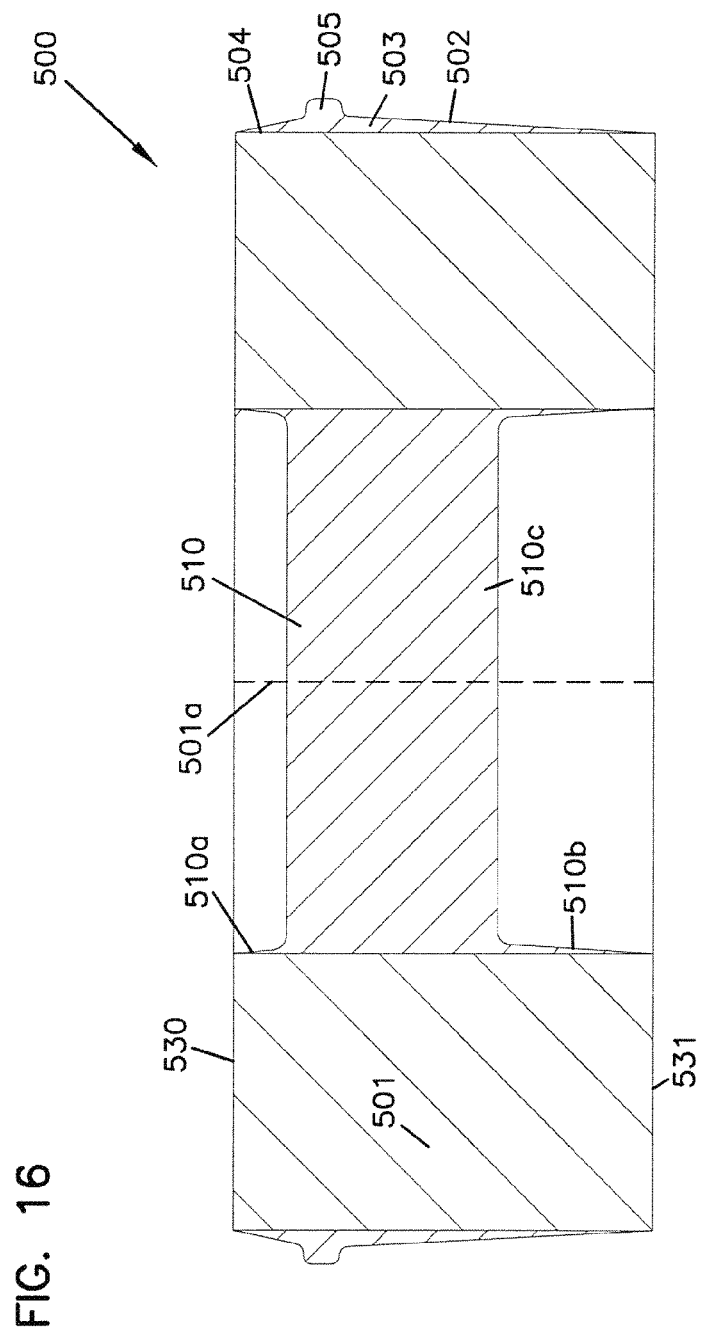
FIG. 16 is a cross-sectional view taken along line 16-16, FIG. 15.

In FIG. 16 a cross-sectional view of element 500 is depicted. In FIG. 16 one can see opposite flow surfaces 530, 531 of the media pack 501.

For the arrangement shown in FIG. 16, the surfaces 530 and 531 are planar and parallel to one another. Conical or bullet nosed stepped surfaces analogous to those for a circular element shown in FIGS. 11 and 12, can be provided, in an analogous manner.

Referring to FIG. 16, section 503 is generally analogous to section 280, FIG. 7, and tapers from housing seal 505 toward end 531; and, region 504 is generally analogous to region 281, and tapers from housing seal 505 toward end surface 530. Of course alternative configurations are possible.

Referring to FIG. 16, core 510 include axial, oppositely, outwardly projecting skirts 510a and 510b on opposite sides of the portion 510c. Alternate configurations for core 510 are possible. Core 510 of course seals lead end 501a, media pack 501.

Figure 17:
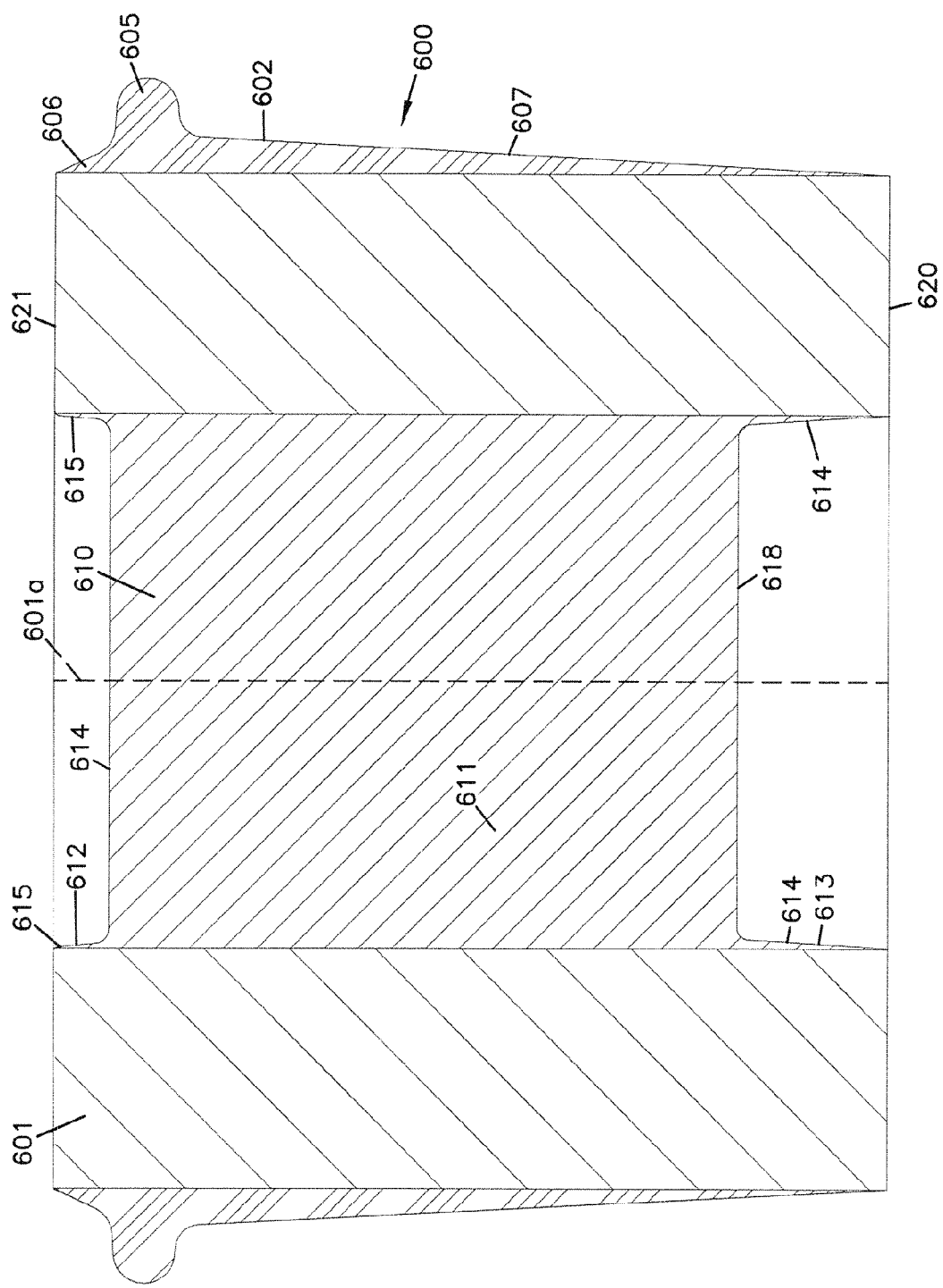
FIG. 17 is a cross-sectional view of a second obround cartridge.

In FIG. 17, an analogous obround element 600 is shown in cross-section, comprising media pack 601 and overmold 602. The overmold 602 comprises seal portion 605 and end portions 606, 607. The particular seal arrangement 605 depicted in FIG. 17 is also an axial seal arrangement, but has a different configuration than arrangement 505, FIG. 16.

Center core 610 is shown comprising central portion 611 and oppositely directed concave end portions 612, 613, comprising axially outwardly directed skirts. Region 612 comprises central recess 614 and axially projecting edge regions 615. Region 613 generally analogously comprises central portion 618 and axially projecting end regions 619. In general, core 610 seals lead end 601a of media pack 601.

In FIG. 17, section 607 is generally analogous to section 280, FIG. 7, and tapers in extension from housing seal 605 toward end surface 620 of media pack 601; and, region 606 is generally analogous to region 281 and tapers downwardly in thickness from housing seal 605 toward end flow surface 621 of media pack 601. Of course alternatives are possible.

Figure 18:
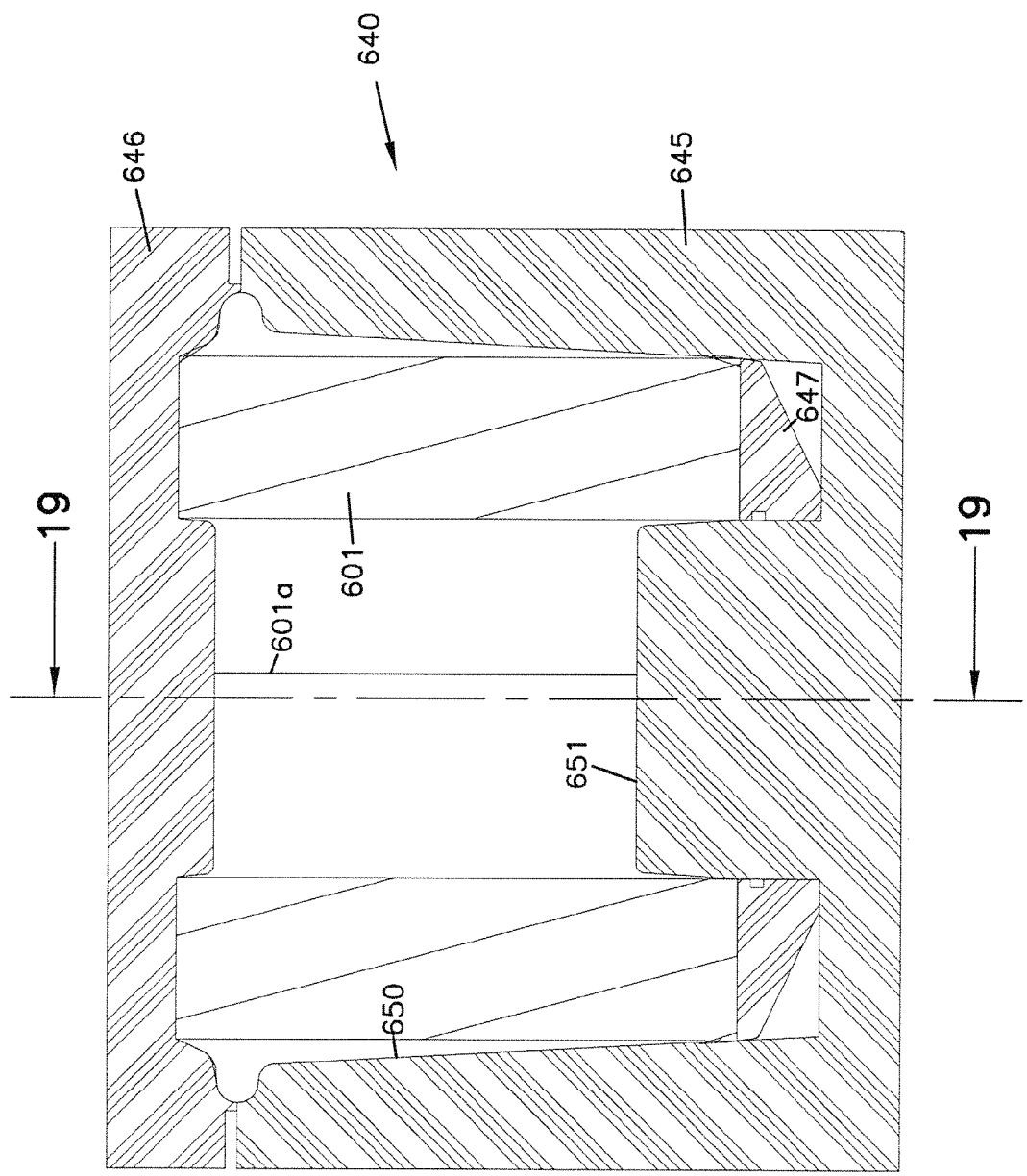
FIG. 18 is a schematic cross-sectional view of a mold arrangement having a media pack therein, for use in forming the arrangement of FIG. 17.

In FIG. 18, cross-sectional view of a mold arrangement 640 useable to form element 600 is shown. The mold arrangement 640 is depicted with media pack 601 positioned therein. The mold arrangement 640 comprises base 645, cover 646 and moveable platform 647, analogously to mold arrangement 240, FIG. 8. When cavities 650 and 651 are provided with resin, after molding an arrangement analogous to that shown in FIG. 17 will result.

Figure 19:
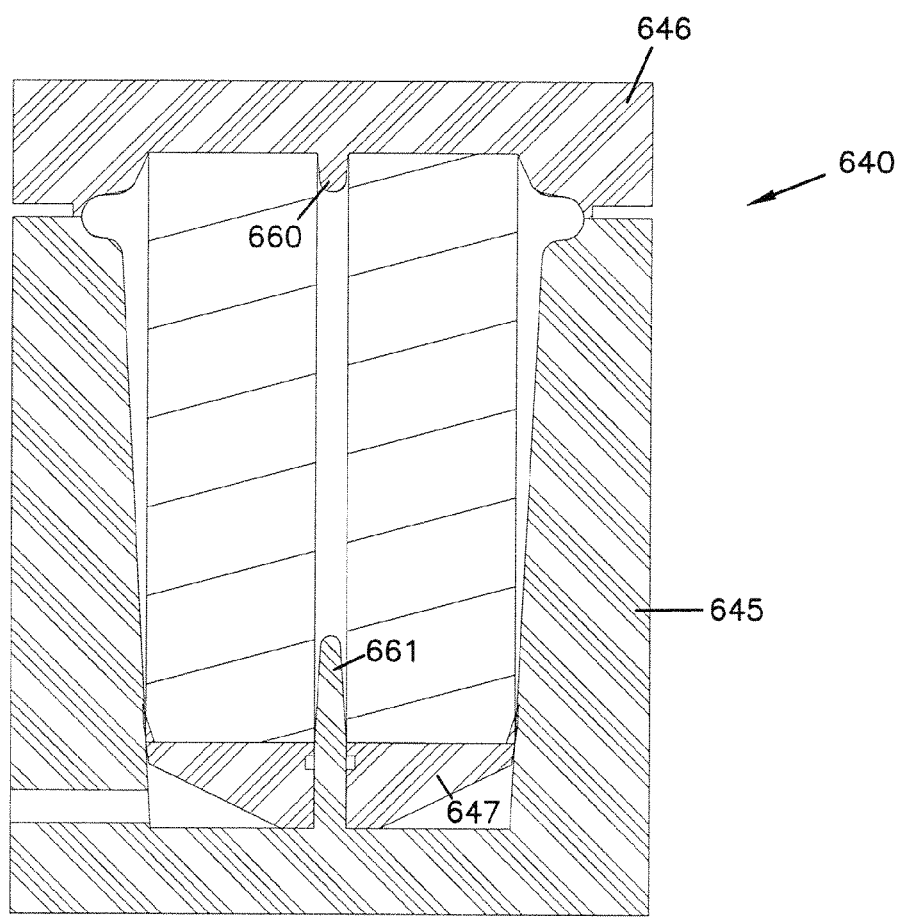
FIG. 19 is a cross-sectional view of the mold arrangement of FIG. 18, taken in the direction of arrow 19-19, thereof.

In FIG. 19 the same mold arrangement 640 is depicted in cross-sectional view taken perpendicularly to the view of FIG. 18. Note projections 660, 661, which will form regions 614 and 613, respectively, in the cartridge 600, FIG. 17.

It is noted that for the obround version shown in cross-section in FIGS. 16 and 17, cores 510, 610 are provided. Alternately, obround versions can be provided without center cores, but rather the sealing provided by compressing the media such that the winding bead provides a seal at one end. This approach is described for example in PCT application number US04/07927, filed Mar. 17, 2004, incorporated herein by reference. Further when such an approach is used, typically a lead end seal needs to be provided in the single facer strip, between the corrugated sheet and the facing sheet. If such a seal is required, it can be provided by sealant applied at this location or by other means, prior to coiling.

IV. Some Final Observations

It is noted that surfaces within the molds, especially side surfaces, can be configured to have trademarks, decorations or other indicia in the overmolds. The indicia is a matter of choice and it can include trademark information, design presentation or instructional or informational material.

Herein the cured-in-place jackets are shown provided as mold-in-place jackets or overmolds with integral housing seal arrangements. They can be provided separately, for example with a jacket first applied and a housing seal later applied. The jacket does not need to be applied by molding, for example it could be sprayed or otherwise applied, with a follow-up cure. The housing seal is preferably molded in place. However, it can be separately molded and attached in some applications.

The housing seals depicted in here are generally axial seals, that is they operate for axial compression between housing components. Alternatively, radial seals could be molded in the same locations, in some arrangements, if desired. Also, multiple seals could be used.

The arrangements shown have preferred cores with concave ends. Again, alternate cores are possible, in some applications.

Herein, three regions preferably of molded urethane (not counting flute seals if urethane is used at that location) are generally described. These three regions are: the housing seal; the overmold; and, if used, the mold-in-place core. It is not required that the same urethane would be used at all three locations, although in some instances the same urethane may be.

With respect to the core, urethane having a density of no more than 15 lbs./cubic foot (0.24 g/cc), and sometimes no more than 10 lbs./cubic foot (0.16 g/cc), can be used, although alternatives (higher density) are possible. It is anticipated that the density would typically be at least 5 lbs/cubic foot (0.08 g/cc).

With respect to the parts of the overmold that are not a housing seal, a similar requirement is made.

As to the part of the overmold that forms the housing seal, typically a material having a density of at least 10 lbs./cubic foot (0.16 g/cc) would be preferred, although material as low as 5 lbs./cubic foot (0.08 g/cc) may be acceptable for some light duty applications. In many instances it may be preferred to have a material having a density no greater than about 22 lbs./cubic foot (0.35 g/cc).

With respect to all three locations, the upper range possible is a matter of choice. For example the core can be poured from a material that will cure to a relatively high density, if desired. Thus a material having a density of 50 lbs./cubic foot (0.8 g/cc) or more could be used. Such a material would typically have a hardness Shore A of 80 or greater. However such a material will not typically be advantageous, since it adds weight and cost.

As to the overmold and housing seal, again a relatively firm or hard material can be used in some instances. However in many instances the housing configuration will be such as to take, by preference, a relatively soft housing seal as characterized.

What is claimed is:

1. An air filter cartridge comprising:
   (a) a coiled media combination comprising a fluted sheet secured to a facing sheet and defining a set of inlet flutes and a set of outlet flutes extending between first and second, opposite, media combination flow ends; the coiled media combination defining:
      (i) a coil having a center extending between the first and second, opposite, media combination flow ends and an outer sidewall extending between the first and second, opposite, media combination flow ends; and,
      (ii) a media combination lead end positioned inside of the coil center; and,
   (b) a mold-in-place center resulting from putting a sealant material into an open end of the center of the coil and allowing the sealant to seal at least a portion of the lead end and to close the center against air flow therethrough.

2. An air filter cartridge according to claim 1 wherein:
   (a) the mold-in-place center has opposite ends at least one of which has an axially, outwardly, projecting end skirt to seal a portion of the lead end.

3. An air filter cartridge according to claim 1 wherein:
   (a) the mold-in-place center is formed from a resin that increases in volume by at least 20% during cure.

4. An air filter cartridge according to claim 1 wherein:
   (a) the mold-in-place center is formed from a resin that increases in volume by at least 40% during cure.

5. An air filter cartridge according to claim 1 wherein:
   (a) the mold-in-place center is formed from a resin that increases in volume by at least 50% during cure.

6. An air filter cartridge according to claim 1 wherein:
   (a) the mold-in-place center comprises a foamed polyurethane core formed from a resin that increases in volume by at least 20% during core.

7. An air filter cartridge according to claim 1 wherein:
   (a) the center has a density of no greater than 0.24 g/cc.

8. An air filter cartridge according to claim 1 wherein:
   (a) the coiled media combination has a circular perimeter shape.

9. An air filter cartridge according to claim 1 wherein:
   (a) a housing seal arrangement is positioned secured to the media pack.

10. An air filter cartridge according to claim 9 wherein:
    (a) the housing seal arrangement extends around the media pack.

11. An air filter cartridge according to claim 10 wherein:
    (a) the housing seal arrangement comprises a mold-in-place seal positioned on an outside of the media pack.

12. An air filter cartridge according to claim 11 wherein:
    (a) the housing seal arrangement comprises an axial pinch seal.

13. An air filter cartridge according to claim 9 wherein:
    (a) the housing seal arrangement includes a mold-in-place seal member.

14. An air filter cartridge according to claim 9 wherein:
    (a) the housing seal arrangement comprises an axial pinch seal.

15. An air filter cartridge according to claim 14 wherein:
    (a) the axial pinch seal has opposite housing engagement surfaces spaced at least 4 mm apart.

16. A method of forming an air filter cartridge; the method comprising:
    (a) coiling a strip of fluted media secured to facing media to define a media combination comprising:
       (i) inlet and outlet flutes;
       (ii) a coil center; and,
       (iii) a media combination lead end positioned in the coil center; and,
    (b) molding a molded-in-place center within an end of the coil center;
       (i) the step of molding comprising putting a sealant material in an end of the coil center, after the step of coiling, and molding the sealant material to seal at least a portion of a lead end and to seal the center against air flow therethrough.

17. A method according to claim 16 wherein:
    (a) the step of molding comprises using a resin that increases in volume by at least 40% during cure.

18. A method according to claim 16 wherein:
    (a) the step of molding comprises using a resin that increases in volume by at least 50% during cure.

19. A method according to claim 16 wherein:
    (a) the step of molding comprises curing a polyurethane resin.

20. A method according to claim 16 wherein:
    (a) the fluted sheet is connected to the facing sheet with sonic welding.

21. An air filter cartridge according to claim 1 wherein:
    (a) the coiled media includes sonically welded media therein.

22. An air filter cartridge according to claim 1 wherein:
    (a) the mold-in-place center comprises a mold-in-place center core is configured to extend along at least 80% of a lead end seal length.

23. An air filter cartridge according to claim 1 wherein:
(a) the mold-in-place center is formed from a resin that will rise during cure.

24. A method according to claim 16 wherein:
(a) the step of molding includes projecting a projection on a mold into the coil center.

25. A method according to claim 16 wherein:
(a) the mold-in-place center is formed from a resin that will rise during cure.

26. A method according to claim 16 wherein:
(a) the mold-in-place center is formed from a resin that will increase in volume by at least 40% during cure.

27. An air filter cartridge comprising:
(a) a coiled media combination comprising a fluted sheet secured to a facing sheet and defining a set of inlet flutes and a set of outlet flutes and defining first and second, opposite, media combination flow ends; the coiled media combination defining a coil having a center extending between the first and second, opposite, media combination flow ends and an outer sidewall extending between the first and second, opposite, media combination flow ends; and,
(b) a mold-in-place center resulting from putting at least a portion of sealant material through an open end of the center of the coil and allowing the sealant to seal and close the center against air flow therethrough.

28. An air filter cartridge according to claim 27 wherein:
(a) the mold-in-place center is formed from a resin that increases in volume by at least 20% during cure.

29. A method of forming an air filter cartridge; the method comprising:
(a) coiling a strip of fluted media secured to facing media to define a media combination comprising:
(i) inlet and outlet flutes; and
(ii) a coil center; and
(b) molding a molded-in-place center within an end of the coil center;
(i) the step of molding being conducted after the step of coiling and comprising putting at least a portion of sealant material through an open end of the coil center and molding the sealant material to seal the center against air flow therethrough.

30. A method according to claim 29 wherein:
(a) the step of molding comprises using a resin that increases in volume by at least 40% during cure.

31. An air filter cartridge comprising:
(a) a coiled media combination comprising fluted media secured to facing media and defining a media combination inlet flow end and an opposite media combination outlet flow end; the media combination defining:
(i) a coil having a center extending between the opposite flow ends;
(ii) a media combination lead end positioned inside of the coil center; and,
(b) a mold-in-place center resulting from putting a sealant material into an open end of the center of the coil and allowing the sealant to seal at least a portion of the lead end and to close the center against air flow therethrough.

32. An air filter cartridge according to claim 31 wherein:
(a) the mold-in-place center is formed from a resin that increases in volume by at least 20% during cure.

33. An air filter cartridge according to claim 32 wherein:
(a) a housing seal arrangement is positioned secured to the media pack.

* * * * *